(12) United States Patent
Wang et al.

(10) Patent No.: US 12,197,032 B2
(45) Date of Patent: Jan. 14, 2025

(54) OPTICAL IMAGING LENS ASSEMBLY

(71) Applicant: Zhejiang Sunny Optics Co., Ltd., Yuyao (CN)

(72) Inventors: Xu Wang, Yuyao (CN); Yuhao Wang, Yuyao (CN); Lingbo He, Yuyao (CN); Lin Huang, Yuyao (CN); Fujian Dai, Yuyao (CN); Liefeng Zhao, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 440 days.

(21) Appl. No.: 17/558,513

(22) Filed: Dec. 21, 2021

(65) Prior Publication Data

US 2022/0236515 A1 Jul. 28, 2022

(30) Foreign Application Priority Data

Jan. 25, 2021 (CN) .......................... 202110095951.1

(51) Int. Cl.
*G02B 7/09* (2021.01)
*G02B 3/00* (2006.01)
(Continued)

(52) U.S. Cl.
CPC .............. *G02B 7/09* (2013.01); *G02B 3/0043* (2013.01); *G02B 13/0075* (2013.01); *G02B 26/004* (2013.01)

(58) Field of Classification Search
CPC ............ G02B 13/001; G02B 13/0015; G02B 13/002; G02B 13/0045; G02B 3/02;
(Continued)

(56) References Cited

U.S. PATENT DOCUMENTS

2018/0275320 A1\* 9/2018 Hsieh ................... G02B 13/004
2019/0033604 A1    1/2019 Chen et al.
(Continued)

FOREIGN PATENT DOCUMENTS

CN        101988984 A    3/2011
CN        109782423 A    5/2019
(Continued)

OTHER PUBLICATIONS

H. Gross, Handbook of Optical Systems, vol. 3: Aberration Theory and Correction of Optical Systems, Wiley, pp. 377-379 (Year: 2007).*

(Continued)

*Primary Examiner* — Marin Pichler
(74) *Attorney, Agent, or Firm* — Reising Ethington P.C.

(57) ABSTRACT

An optical imaging lens assembly is provided, along an optical axis from an object side to an image side, sequentially includes: a first lens having refractive power; an autofocus assembly; a second lens having refractive power, and an image-side surface of the second lens being a concave surface; a third lens having refractive power, and an image-side surface of the third lens being a convex surface; a fourth lens having refractive power, an object-side surface of the fourth lens being a concave surface, and an image-side surface of the fourth lens being a convex surface; and at least one subsequent lens having refractive power. A radius of curvature of an object-side surface of the autofocus assembly being variable.

11 Claims, 22 Drawing Sheets

(51) Int. Cl.
*G02B 13/00* (2006.01)
*G02B 26/00* (2006.01)

(58) Field of Classification Search
CPC ... G02B 9/00; G02B 9/60; G02B 9/62; G02B 9/64; G02B 3/12; G02B 7/04; G02B 7/08; G02B 7/09; G02B 13/0075; G02B 26/004
See application file for complete search history.

(56) References Cited

U.S. PATENT DOCUMENTS

| | | | | |
|---|---|---|---|---|
| 2022/0236539 A1* | 7/2022 | Gao | ............... | G02B 9/60 |
| 2022/0382020 A1* | 12/2022 | Kwon | ............. | G02B 3/12 |

FOREIGN PATENT DOCUMENTS

| | | |
|---|---|---|
| CN | 111077602 A | 4/2020 |
| TW | 1701474 B | 8/2020 |
| WO | 2016197604 A1 | 12/2016 |

OTHER PUBLICATIONS

Indian Examination Report corresponding to Indian Application No. 202114059499, Aug. 4, 2022, 5 pages.
English translation of Chinese Notice of Allowance corresponding to application 2023070400055430, dated Jul. 4, 2023, 9 pages.
Hearing Notice corresponding to Indian application 202114059499, dated Dec. 27, 2023, 2 pages.

* cited by examiner

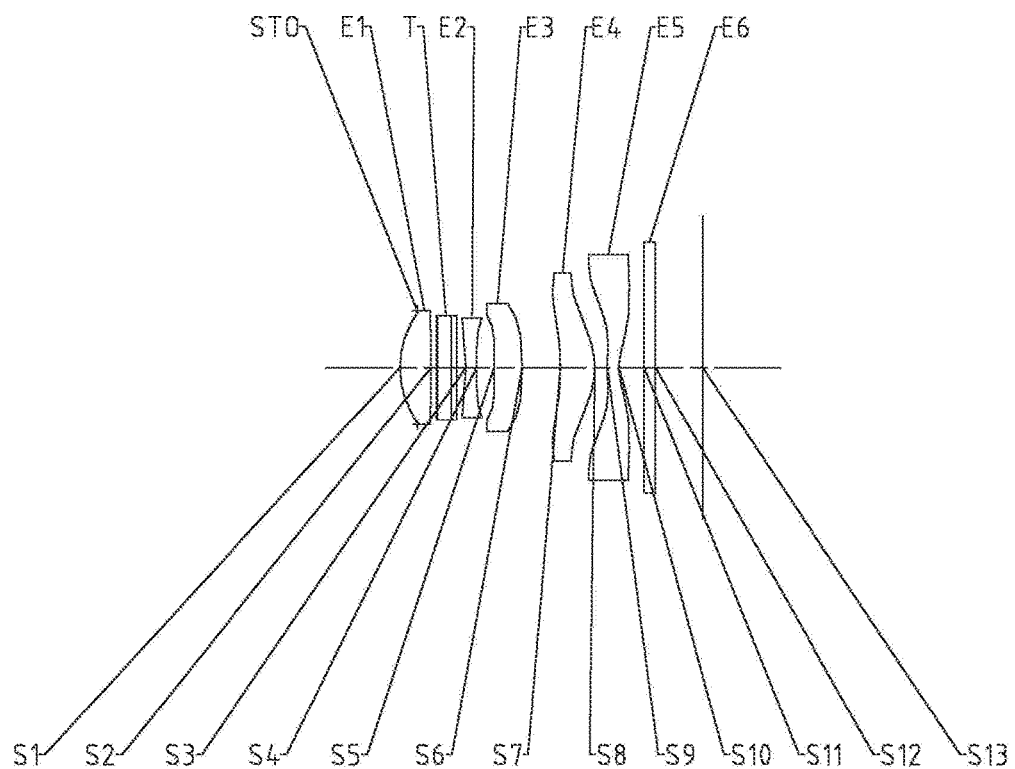
Fig. 6
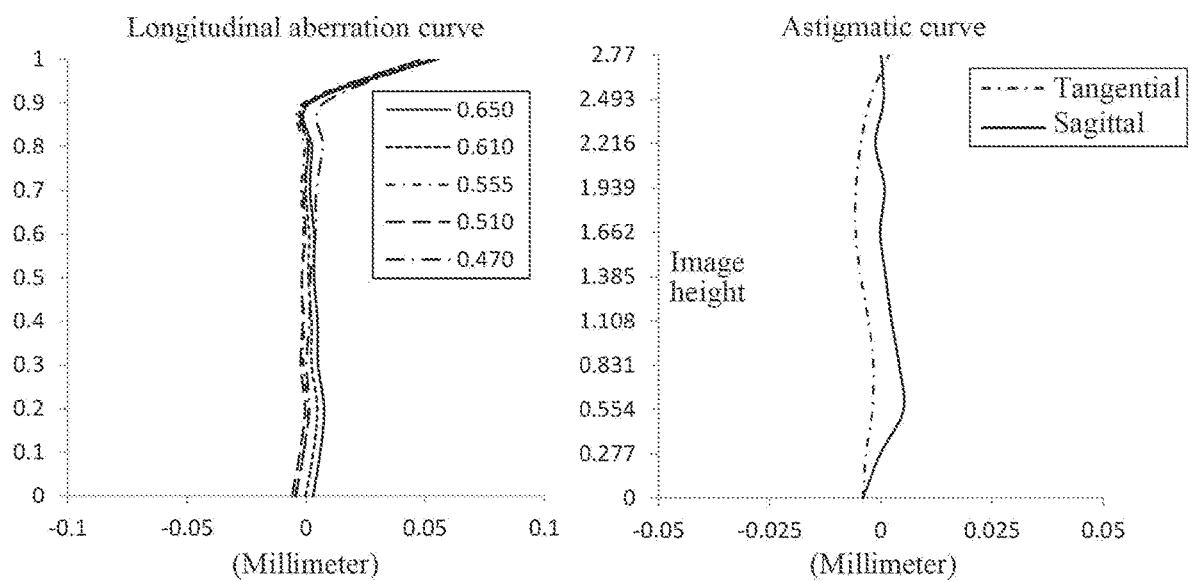
Fig. 7A
Fig. 7B

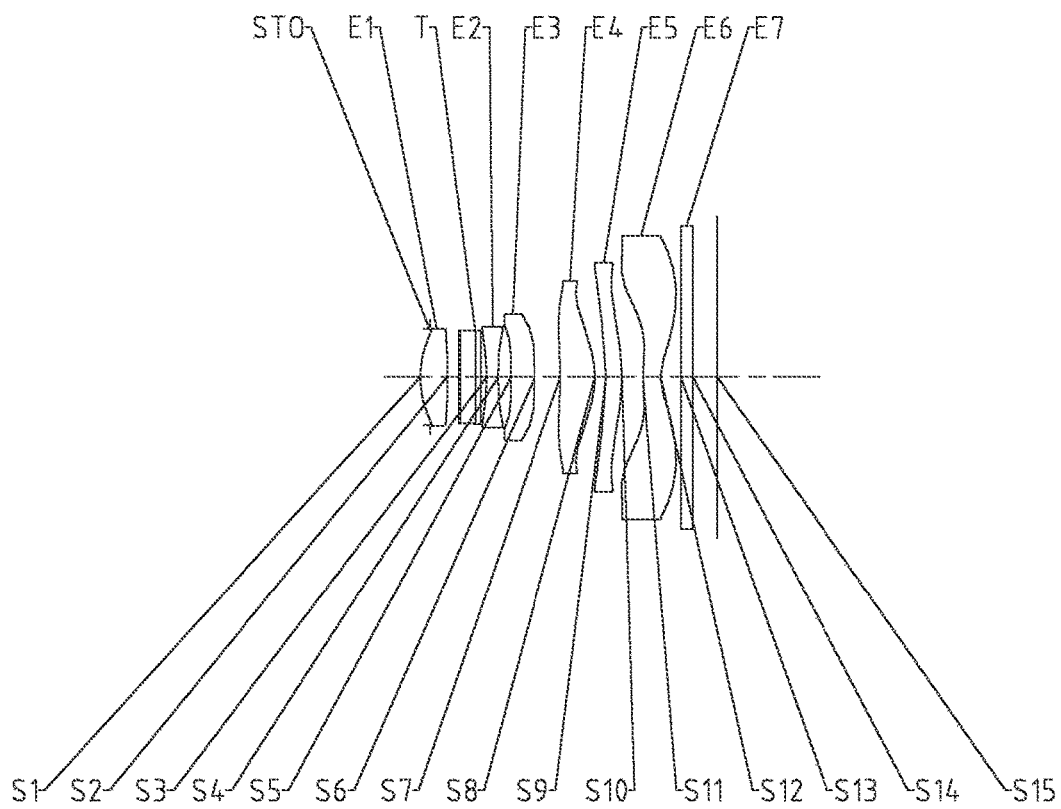
Fig. 26
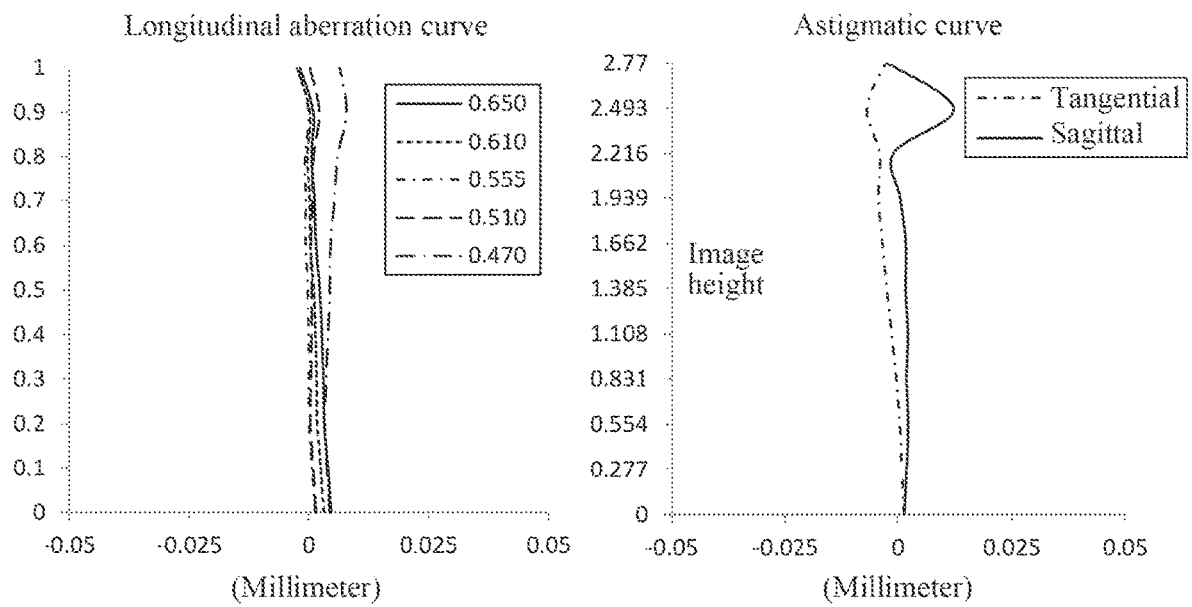
Fig. 27A
Fig. 27B

OPTICAL IMAGING LENS ASSEMBLY

CROSS-REFERENCE TO RELATED APPLICATIONS

This application claims the priority from Chinese Patent Application No. 202110095951.1, filed in the National Intellectual Property Administration (CNIPA) on Jan. 25, 2021, the content of which is hereby incorporated by reference in its entirety.

TECHNICAL FIELD

The present disclosure relates to the field of optical elements, and in particular, to an optical imaging lens assembly.

BACKGROUND

With the advancement of science and technology, smart phones have become indispensable application devices in people's daily lives. In particular, the camera function of smart phones is playing an increasingly important role in people's daily lives. At the same time, with the development trend of miniaturization of smart phones, users are pursuing the imaging performance of optical imaging lens assemblies mounted on the smart phones, as well as expecting the lens assemblies to have a thinner and lighter appearance.

At present, in order to improve the imaging performance of the optical imaging lens assemblies in the market, mechanical zooming is mostly used to satisfy that the optical imaging lens assemblies have good imaging effects in different shooting scenarios.

SUMMARY

One aspect of the present disclosure provides an optical imaging lens assembly, and the optical imaging lens assembly along an optical axis from an object side to an image side sequentially includes: a first lens having refractive power; an autofocus assembly; a second lens having refractive power, and an image-side surface of the second lens being a concave surface; a third lens having refractive power, and an image-side surface of the third lens being a convex surface; a fourth lens having refractive power, an object-side surface of the fourth lens being a concave surface, and an image-side surface of the fourth lens being a convex surface; and at least one subsequent lens having refractive power. A radius of curvature of an object-side surface of the autofocus assembly is variable.

In an implementation, a total effective focal length f of the optical imaging lens assembly and a radius of curvature R10 of an image-side surface of the fifth lens satisfy: $1.0<|f/R10|<5.5$.

In an implementation, an effective focal length f1 of the first lens and a radius of curvature R1 of an object-side surface of the first lens satisfy: $1.5<f1/R1<2.5$.

In an implementation, a radius of curvature R6 of the image-side surface of the third lens and an effective focal length f3 of the third lens satisfy: $0.5<|R6/f3|<2.5$.

In an implementation, an effective focal length f4 of the fourth lens and a radius of curvature R8 of the image-side surface of the fourth lens satisfy: $-3.0<f4/R8<-2.0$.

In an implementation, a center thickness CT1 of the first lens on the optical axis and a center thickness D of the autofocus assembly on the optical axis satisfy: $1.0<CT1/D<2.0$.

In an implementation, a center thickness D of the autofocus assembly on the optical axis and a spaced interval T1-T between the first lens and the autofocus assembly on the optical axis satisfy: $1.5<D/T1-T<6.0$.

In an implementation, a center thickness CT5 of the fifth lens on the optical axis and a spaced interval T34 between the third lens and the fourth lens on the optical axis satisfy: $1.0<T34/CT5<3.5$.

In an implementation, a center thickness CT4 of the fourth lens on the optical axis and a center thickness CT2 of the second lens on the optical axis satisfy: $2.0<CT4/CT2<5.0$.

In an implementation, half of a maximum field-of-view Semi-FOV of the optical imaging lens assembly satisfies: Semi-FOV$>25°$.

In an implementation, a distance TTL from the object-side surface of the first lens to an imaging plane of the optical imaging lens assembly on the optical axis and half of a diagonal length ImgH of an effective pixel area on the imaging plane of the optical imaging lens assembly satisfy: $1.5<TTL/ImgH<2.1$.

In an implementation, the autofocus assembly along the optical axis from the first lens to the second lens sequentially comprises: a flexible film, a liquid material, and a light-transmitting module, wherein, the flexible film is arranged on an object-side surface of the liquid material; and an image-side surface of the liquid material is glued to the light-transmitting module.

In an embodiment, the autofocus assembly along the optical axis from the first lens to the second lens sequentially includes: a flexible film, a liquid material, and a light-transmitting module, where, the flexible film is arranged on an object-side surface of the liquid material; and an image-side surface of the liquid material is glued to the light-transmitting module.

The present disclosure provides an optical imaging lens assembly suitable for portable electronic products, having stable image quality, autofocus function, ultra-thin, miniaturization, and good imaging quality through a reasonable distribution of the refractive power and optimization of optical parameters.

BRIEF DESCRIPTION OF THE DRAWINGS

By reading detailed description of non-limiting embodiments with reference to the following accompanying drawings, other features, objectives and advantages of the present disclosure will be more apparent:

FIG. 6 is a schematic structural diagram illustrating an optical imaging lens assembly according to Example 2 of the present disclosure;

FIGS. 7A-7D respectively illustrate a longitudinal aberration curve, an astigmatic curve, a distortion curve and a lateral color curve of the optical imaging lens assembly according to Example 2;

FIG. 26 is a schematic structural diagram illustrating an optical imaging lens assembly according to Example 6 of the present disclosure;

FIGS. 27A-27D respectively illustrate a longitudinal aberration curve, an astigmatic curve, a distortion curve and a lateral color curve of the optical imaging lens assembly according to Example 6;

DETAILED DESCRIPTION OF EMBODIMENTS

Figure 1:
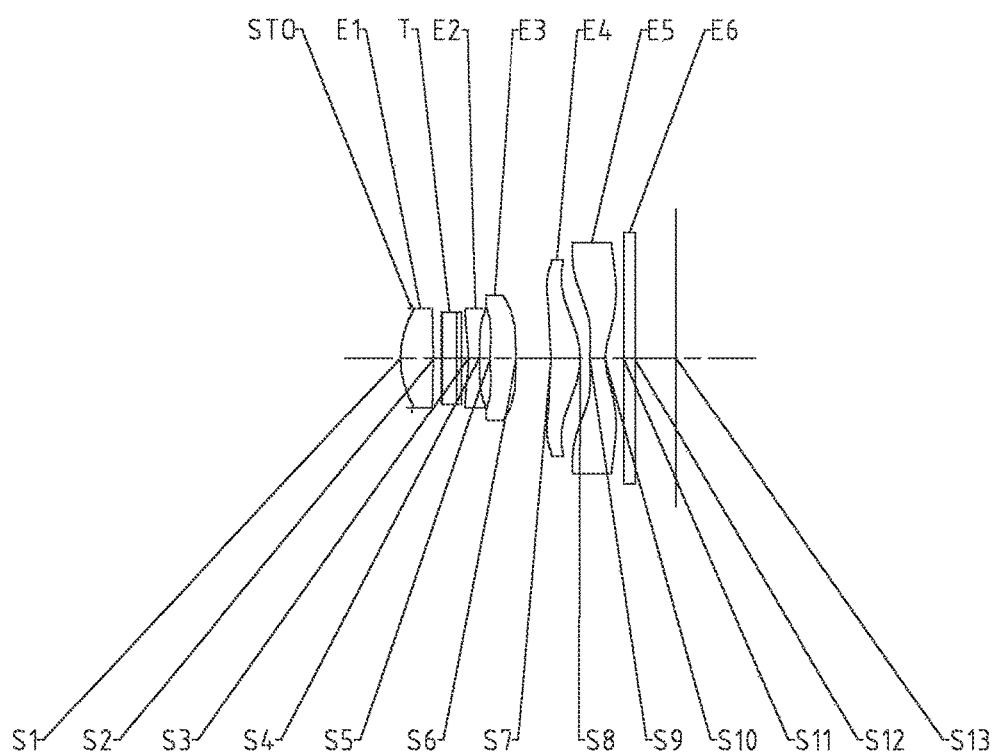
FIG. 1 is a schematic structural diagram illustrating an optical imaging lens assembly according to Example 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens assembly according to exemplary implementations of the present disclosure may include an autofocus assembly and at least five lenses having refractive power. The at least five lenses having refractive power are a first lens, a second lens, a third lens, a fourth lens and at least one subsequent lens, respectively. The first lens, the autofocus assembly, the second lens, the third lens, the fourth lens and the at least one subsequent lens are sequentially arranged from the object side to the image side along the optical axis. There may be a spaced interval between the first lens and the autofocus assembly. There may be a spaced interval between the autofocus assembly and the second lens. There may be a spaced interval in any two adjacent lenses from the second lens to a lens closest to the image side.

According to an exemplary implementation of the present disclosure, the autofocus assembly may sequentially include a flexible film, a liquid material, and a light-transmitting module from the first lens to the second lens along the optical axis. The flexible film may be arranged on an object-side surface of the liquid material. An image-side surface of the liquid material may be glued to the light-transmitting module. Here, the light-transmitting module may be a flat glass plate.

According to an exemplary implementation of the present disclosure, a radius of curvature of an object-side surface of the autofocus assembly is variable, that is, the shape of the flexible film and the object-side surface of the liquid material are variable. The radius of curvature of the object-side surface of the autofocus assembly may be changed with the change of a distance between the optical imaging lens assembly and the object, so as to realize the autofocus function of the optical imaging lens assembly.

Figure 31A:
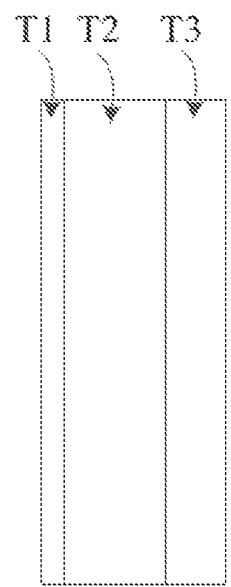
FIG. 31A and FIG. 31B respectively illustrate schematic structural diagrams of an autofocus assembly of the optical imaging lens assembly in the present disclosure, when a distance from the object is different.
Figure 31B:
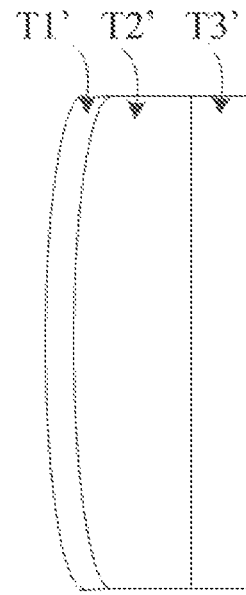

According to an exemplary implementation of the present disclosure, the autofocus assembly includes: the flexible film, the liquid material, and the light-transmitting module. FIG. 31A shows a schematic structural diagram of the autofocus assembly in the present disclosure. The autofocus assembly includes a flexible film T1, a liquid material T2, and a light-transmitting module T3, where the flexible film T1 and the liquid material T2 are both plane structures. FIG. 31B shows a schematic structural diagram of another autofocus assembly in the present disclosure. The autofocus assembly includes a flexible film T1', a liquid material T2', and a light-transmitting module T3', where the flexible film T1' and the object-side surface of the liquid material T2' are deformed. Specifically, the liquid material T2' may be disposed between the flexible film T1' and the light-transmitting module T3', and the liquid material T2' may be connected to a conductive material (not shown). When an external voltage is applied to the conductive material, it may cause the object-side surface of the liquid material T2' to deform, which in turn drives the flexible film T1' to deform, and changes a focal length of the autofocus assembly. Therefore, the autofocus function of the lens assembly at different object distances may be realized without changing the total track length of the optical imaging lens assembly, thereby making the optical imaging lens assembly lighter and thinner. It should be understood that the liquid material in the present disclosure is not specifically limited to include only one material. In actual production, in order to reasonably adjust the total effective focal length of the optical imaging lens assembly, a variety of liquid materials, such as a first liquid material, or a second liquid material, may be disposed between the flexible film and the light-transmitting module according to specific needs. In addition, the first liquid material, the second liquid material, and the like are not compatible with each other. When a voltage is applied to the conductive material, the liquid material may be deformed, which in turn drives the flexible film and a contact surface type of the first liquid material and the second liquid material to change, so that the focal length of the autofocus assembly is changed, thereby adjusting the total effective focal length of the optical imaging lens assembly.

According to an exemplary implementation of the present disclosure, drive systems such as voice coil motors, microelectromechanical systems, piezoelectric systems, and memory metals may be used to apply voltage to the conductive material. The drive system may adjust the focal length of the optical imaging lens assembly to make the optical imaging lens assembly have a good imaging position, so that the optical imaging lens assembly can clearly image at different distances from the object.

In an exemplary implementation, the first lens may have positive refractive power or negative refractive power; the second lens may have positive refractive power or negative refractive power, and an image-side surface of the second lens may be a concave surface; the third lens may have positive refractive power or negative refractive power, and an image-side surface of the third lens may be a convex surface; a fourth lens may have positive refractive power or negative refractive power, an object-side surface of the fourth lens may be a concave surface, and an image-side surface of the fourth lens may be a convex surface; and the at least one subsequent lens may have positive refractive power or negative refractive power. By reasonably distributing the refractive power and surface type characteristics of each lens, it is beneficial to reduce an overall aberration of the lens assembly and improve imaging quality. In particular, setting the image-side surface of the second lens as a concave surface and setting the image-side surface of the third lens as a convex surface may effectively reduce a spherical aberration of the entire lens assembly.

In an exemplary implementation, the optical imaging lens assembly according to the present disclosure may satisfy: $1.0<|f/R10|<5.5$, where f is a total effective focal length of the optical imaging lens assembly, and R10 is a radius of curvature of an image-side surface of the fifth lens. Satisfying $1.0<|f/R10|<5.5$ may reasonably distribute the total effective focal length of the lens assembly, and may control an overall third-order astigmatism of the lens assembly within a reasonable range, which is beneficial to improve the imaging quality of an off-axis field-of-view of the lens assembly.

In an exemplary implementation, the optical imaging lens assembly according to the present disclosure may satisfy: $1.5<f1/R1<2.5$, where f1 is an effective focal length of the first lens, and R1 is a radius of curvature of an object-side surface of the first lens. More specifically, f1 and R1 may further satisfy: $1.6<f1/R1<2.4$. Satisfying $1.5<f1/R1<2.5$ may control a deflection angle of an edge field-of-view at the first lens, and may effectively reduce sensitivity of the lens assembly.

In an exemplary implementation, the optical imaging lens assembly according to the present disclosure may satisfy: $0.5<|R6/f3|<2.5$, where R6 is a radius of curvature of the image-side surface of the third lens, and f3 is an effective focal length of the third lens. More specifically, R6 and f3 may further satisfy: $0.5<|R6/f3|<2.3$. Satisfying $0.5<|R6/f3|<2.5$ may effectively control the refractive power of the third lens, thereby controlling a spherical aberration of the third lens, so that the lens assembly has good imaging quality on the axis.

In an exemplary implementation, the optical imaging lens assembly according to the present disclosure may satisfy: $-3.0<f4/R8<-2.0$, where f4 is an effective focal length of the fourth lens, and R8 is a radius of curvature of the image-side surface of the fourth lens. More specifically, f4 and R8 may further satisfy: $-2.8<f4/R8<-2.0$. Satisfying $-3.0<f4/R8<-2.0$ may control a third-order coma of the fourth lens within a reasonable range, which is beneficial to balance the amount of coma generated by a front lens, so that the lens assembly has good imaging quality.

In an exemplary implementation, the optical imaging lens assembly according to the present disclosure may satisfy: $1.0<CT1/D<2.0$, where CT1 is a center thickness of the first lens on the optical axis, and D is a center thickness of the autofocus assembly on the optical axis. More specifically, CT1 and D may further satisfy: $1.0<CT1/D<1.7$. Satisfying $1.0<CT1/D<2.0$ may effectively ensure the processing manufacturability of the first lens and the autofocus assembly, thereby making it more suitable for the molding characteristics of plastic lenses, and achieving stability of production and assembly.

In an exemplary implementation, the optical imaging lens assembly according to the present disclosure may satisfy: $1.5<D/T_{1-T}<6.0$, where D is a center thickness of the autofocus assembly on the optical axis, and $T_{1-T}$ is a spaced interval between the first lens and the autofocus assembly on the optical axis. More specifically, D and $T_{1-T}$ may further satisfy: $1.6<D/T_{1-T}<5.9$. Satisfying $1.5<D/T_{1-T}<6.0$ is helpful to ensure that the autofocus assembly has enough space to adjust its curvature, thereby realizing the autofocus function of the lens assembly.

In an exemplary implementation, the optical imaging lens assembly according to the present disclosure may satisfy: $1.0<T34/CT5<3.5$, where CT5 is a center thickness of the fifth lens on the optical axis, and T34 is a spaced interval between the third lens and the fourth lens on the optical axis. More specifically, T34 and CT5 may further satisfy: $1.3<T34/CT5<3.5$. Satisfying $1.0<T34/CT5<3.5$ is contribute to the uniform distribution of the size of each lens, which not only helps ensure the assembly stability of the lens assembly, but also helps reduce the overall aberration of the lens assembly and shorten the total length of the imaging lens assembly.

In an exemplary implementation, the optical imaging lens assembly according to the present disclosure may satisfy: $2.0<CT4/CT2<5.0$, where CT4 is a center thickness of the fourth lens on the optical axis, and CT2 is a center thickness of the second lens on the optical axis. More specifically, CT4 and CT2 may further satisfy: $2.3<CT4/CT2<5.0$. Satisfying $2.0<CT4/CT2<5.0$ is beneficial to control the distortion contribution of each field-of-view of the optical imaging lens assembly within a reasonable range, so as to improve the imaging quality of the optical imaging lens assembly.

In an exemplary implementation, the optical imaging lens assembly according to the present disclosure may satisfy: Semi-FOV>25°, where Semi-FOV is half of a maximum field-of-view of the optical imaging lens assembly. More specifically, Semi-FOV may further satisfy: Semi-FOV>27°. Satisfying Semi-FOV>25° is beneficial to enable the optical imaging lens assembly to obtain a large field-of-view range, and to improve the ability of the optical imaging lens assembly to capture object information.

In an exemplary implementation, the optical imaging lens assembly according to the present disclosure may satisfy: $1.5<TTL/ImgH<2.1$, where TTL is a distance from the object-side surface of the first lens to an imaging plane of the optical imaging lens assembly on the optical axis, and ImgH is half of a diagonal length of an effective pixel area on the imaging plane of the optical imaging lens assembly. More specifically, TTL and ImgH may further satisfy: $1.7<TTL/ImgH<2.1$. Satisfying $1.5<TTL/ImgH<2.1$ may reduce an overall length of the lens assembly as much as possible while ensuring a large imaging plane, ensuring that the optical imaging lens assembly has an ultra-thin effect.

In an exemplary implementation, the optical imaging lens assembly according to the present disclosure further includes a diaphragm provided between the object side and the first lens. Alternatively, the optical imaging lens assembly may further include an optical filter/protective glass for protecting a photosensitive element on the imaging plane.

The present disclosure proposes an optical imaging lens assembly having characteristics such as miniaturization, ultra-thin, autofocus, stable image quality, and high imaging quality. The optical imaging lens assembly according to the above implementations of the present disclosure may employ a plurality of lenses, such as five lenses as described above. By reasonably distributing the refractive power of each lens, the surface shape, the center thickness of each lens and the spaced intervals along the optical axis between the lenses, it may effectively converge incident light, reduce the total track length of the imaging lens assembly and improve the processability of the imaging system, making the optical imaging lens assembly more conducive to production and processing.

In the implementations of the present disclosure, at least one of the surfaces of the lenses is an aspheric surface, that is, at least one of the surfaces from the object-side surface of the first lens to an image-side surface of the lens closest to the image side is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens and the at least one subsequent lens is an aspheric surface. Alternatively, the object-side surface and the image-side surface of each of the first lens, the second lens, the third lens, the fourth lens and the at least one subsequent lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having five lenses or six lenses is described as an example in the implementations, the optical imaging lens assembly is not limited to include five lenses or six lenses. If desired, the optical imaging lens assembly may also include other numbers of lenses.

Specific examples of the optical imaging lens assembly that may be applied to the above implementations are further described below with reference to the accompanying drawings.

Example 1

An optical imaging lens assembly according to Example 1 of the present disclosure is described below with reference to FIGS. 1-5B. FIG. 1 is a schematic structural diagram illustrating the optical imaging lens assembly according to Example 1 of the present disclosure.

As shown in FIG. 1, the optical imaging lens assembly from an object side to an image side sequentially includes: a diaphragm STO, a first lens E1, an autofocus assembly T (including a flexible film, a liquid material and a light-transmitting module), a second lens E2, a third lens E3, a fourth lens E4, a fifth lens E5, an optical filter E6 and an imaging plane S13.

The first lens E1 has positive refractive power, an object-side surface S1 of the first lens is a convex surface, and an image-side surface S2 of the first lens is a convex surface. The second lens E2 has negative refractive power, an object-side surface S3 of the second lens is a concave surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has positive refractive power, an object-side surface S7 of the fourth lens is a concave surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The optical filter E6 has an object-side surface S11 and an image-side surface S12. Light from an object sequentially passes through the surfaces S1 to S12 and is finally imaged on the imaging plane S13.

Table 1 is a table illustrating basic parameters of the optical imaging lens assembly of Example 1, where the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| STO | Spherical | infinite | −0.2147 | | | | |
| S1 | Aspheric | 1.7240 | 0.6214 | 1.55 | 56.1 | 3.09 | −0.0920 |
| S2 | Aspheric | −64.7015 | 0.1538 | | | | 90.0000 |
| | Spherical | RT | 0.0200 | 1.53 | 65.4 | | |
| | Spherical | | 0.2650 | 1.55 | 29.9 | | |
| | Spherical | infinite | 0.1000 | 1.52 | 64.2 | | |
| | Spherical | infinite | 0.1268 | | | | |
| S3 | Aspheric | −2.5729 | 0.2000 | 1.67 | 20.4 | −3.29 | 0.0164 |
| S4 | Aspheric | 15.4391 | 0.2119 | | | | −90.0000 |
| S5 | Aspheric | 6.5295 | 0.4996 | 1.64 | 23.5 | 6.74 | 33.4694 |
| S6 | Aspheric | −12.5948 | 0.6539 | | | | −2.6492 |
| S7 | Aspheric | −8.3449 | 0.5530 | 1.55 | 56.1 | 3.04 | −1.2318 |
| S8 | Aspheric | −1.4184 | 0.1845 | | | | −0.9905 |
| S9 | Aspheric | 3.3433 | 0.2840 | 1.54 | 55.8 | −2.38 | 0.0255 |
| S10 | Aspheric | 0.8956 | 0.3602 | | | | −1.0120 |
| S11 | Spherical | infinite | 0.2100 | 1.52 | 64.2 | | |

TABLE 1-continued

| Surface number | Surface type | Radius of curvature | Thickness/ Distance | Material Refractive index | Abbe number | Focal length | Conic coefficient |
|---|---|---|---|---|---|---|---|
| S12 | Spherical | infinite | 0.7749 | | | | |
| S13 | Spherical | infinite | | | | | |

In this example, an image-side surface of the liquid material and the light-transmitting module may be glued together. By changing the radius of curvature of a flexible film surface of the autofocus assembly T and the radius of curvature of the image-side surface of the liquid material, the total effective focal length of the optical imaging lens assembly may be changed with the change of a distance from the object, thereby realizing the autofocus function of the optical imaging lens assembly. Specifically, when the distance D1 between the optical imaging lens assembly and the object is 350 mm, the object-side surface of the autofocus assembly T (i.e., the flexible film surface and the object-side surface of the liquid material) is a plane surface, and the radius of curvature RT is infinite. When the distance D1 between the optical imaging lens assembly and the object is 150 mm, the object-side surface of the autofocus assembly T is a convex surface, and the radius of curvature RT is 113.3000. When the distance D1 between the optical imaging lens assembly and the object is infinite, the object-side surface of the autofocus assembly T is a concave surface, and the radius of curvature RT is −149.3000.

In this example, the total effective focal length f of the optical imaging lens assembly is 4.41 mm, the total track length TTL of the optical imaging lens assembly (that is, a distance from the object-side surface of the first lens E1 to the imaging plane S13 of the optical imaging lens assembly on the optical axis) is 5.22 mm, half of a diagonal length ImgH of an effective pixel area on the imaging plane S13 of the optical imaging lens assembly is 2.77 mm, half of a maximum field-of-view Semi-FOV of the optical imaging lens assembly is 30.8°, and an F number Fno of the optical imaging lens assembly is 2.48.

In Example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1 + \sqrt{1 - (k+1)c^2 h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1 to S10 in Example 1.

TABLE 2

| Surface number | A4 | A6 | A8 | A10 | A12 | A14 | A16 |
|---|---|---|---|---|---|---|---|
| S1 | −1.3089E−02 | −2.7990E−03 | −7.1141E−04 | −1.4275E−04 | −6.1907E−05 | −1.3867E−05 | −1.3420E−05 |
| S2 | −1.3369E−02 | −2.4340E−03 | −3.5705E−04 | −3.9589E−05 | 1.6406E−05 | −1.6993E−06 | −3.6749E−06 |
| S3 | 6.4401E−02 | −3.3983E−03 | 3.3118E−04 | −1.8862E−06 | −1.7211E−05 | 1.1256E−05 | −6.1193E−06 |
| S4 | 7.2645E−02 | −1.3253E−03 | 5.1880E−04 | 6.1225E−05 | 2.2677E−06 | 3.7380E−06 | 4.1329E−06 |
| S5 | −1.7764E−01 | −4.8914E−03 | 6.1061E−04 | 1.2512E−03 | 4.3865E−04 | 8.8331E−05 | −8.2530E−05 |
| S6 | −2.1906E−01 | 2.5607E−03 | 5.1107E−03 | 1.7362E−03 | 9.7586E−05 | −7.3711E−05 | 2.6148E−05 |
| S7 | 1.6337E−01 | 3.6633E−02 | 1.9395E−03 | −2.2001E−03 | −3.0904E−04 | −4.8554E−04 | 5.8402E−04 |
| S8 | 1.0312E+00 | −6.2618E−02 | −1.7775E−03 | 6.3172E−04 | 4.3076E−03 | −4.4127E−03 | 1.8752E−03 |
| S9 | −1.5950E+00 | 5.3580E−01 | −2.2167E−01 | 7.6890E−02 | −2.3302E−02 | 6.4064E−03 | −3.5760E−03 |
| S10 | −3.5675E+00 | 8.5467E−01 | −2.5371E−01 | 1.0023E−01 | −4.7411E−02 | 1.9792E−02 | −9.4283E−03 |

| Surface number | A18 | A20 |
|---|---|---|
| S1 | 4.2484E−06 | 5.6667E−06 |
| S2 | −1.5856E−05 | −1.4392E−05 |
| S3 | 3.8999E−06 | −3.5295E−06 |
| S4 | −5.7406E−07 | −1.3695E−06 |
| S5 | −1.6720E−04 | −1.7408E−04 |
| S6 | 5.6350E−05 | 5.9989E−05 |
| S7 | −3.4852E−04 | 7.6033E−05 |
| S8 | −6.4955E−04 | 4.2654E−04 |
| S9 | 1.0625E−03 | 4.4792E−04 |
| S10 | 5.0597E−03 | −1.7163E−03 |

Figure 2A:
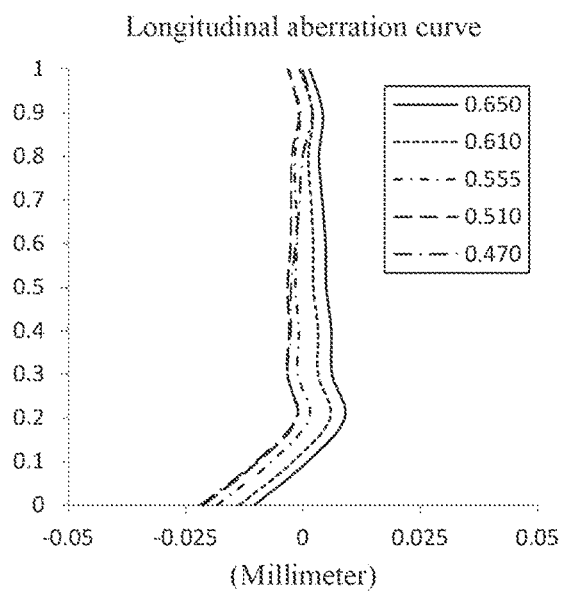
FIGS. 2A-2D respectively illustrate a longitudinal aberration curve, an astigmatic curve, a distortion curve and a lateral color curve of the optical imaging lens assembly according to Example 1.
Figure 2B:
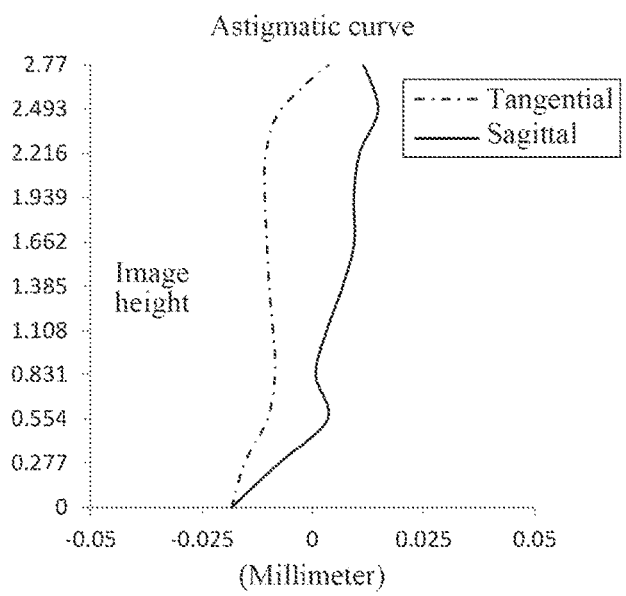
Figure 2C:
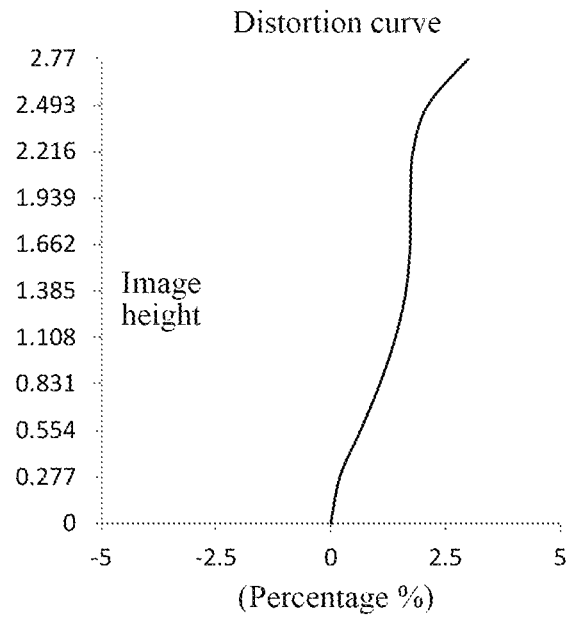
Figure 2D:
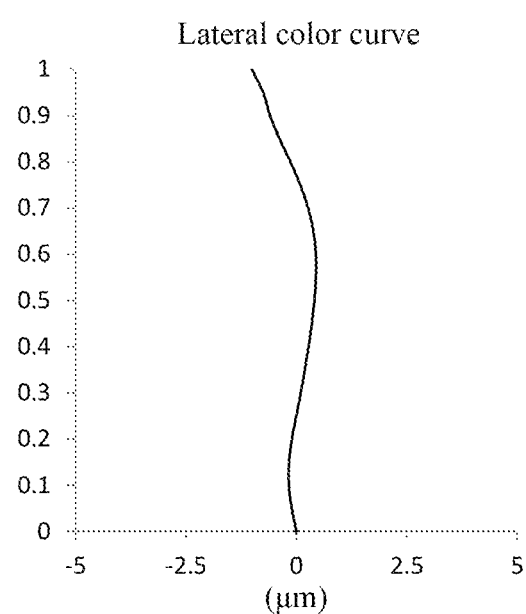
Figure 3A:
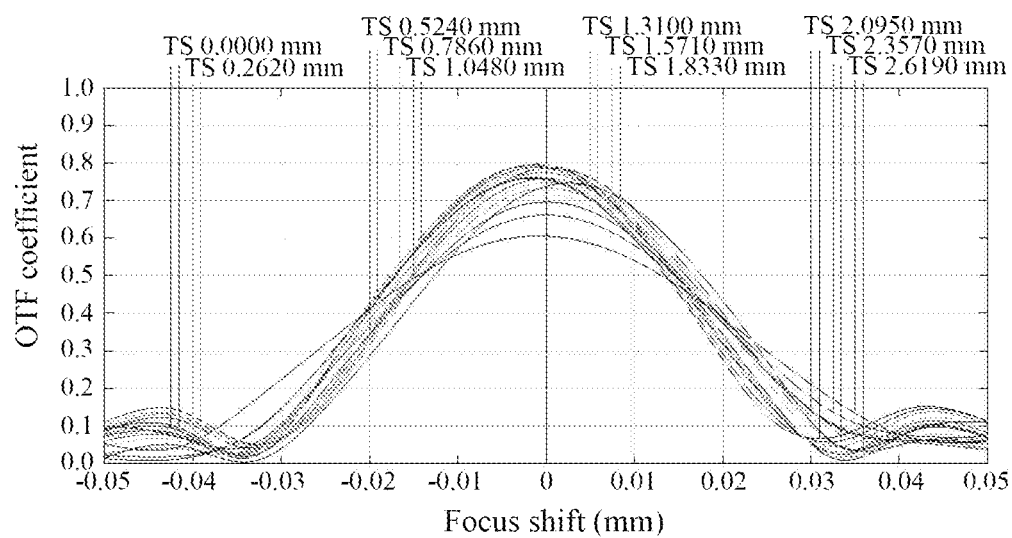
FIG. 3A and FIG. 3B respectively illustrate a focus shift curve diagram and a modulation transfer function (MTF) curve diagram of the optical imaging lens assembly in Example 1 when a distance from the object is 350 mm, within a waveband range of 470 nm to 650 nm.
Figure 3B:
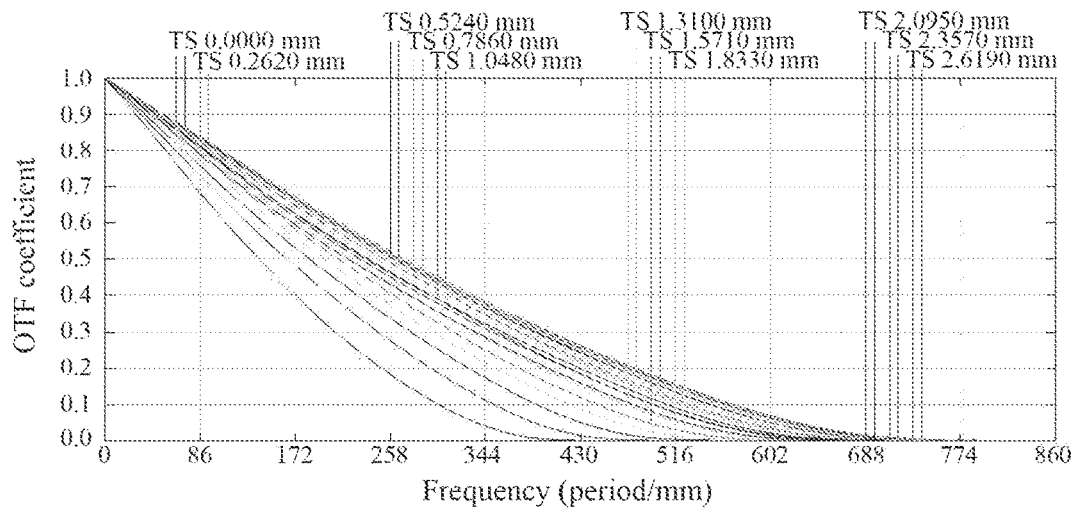
Figure 4A:
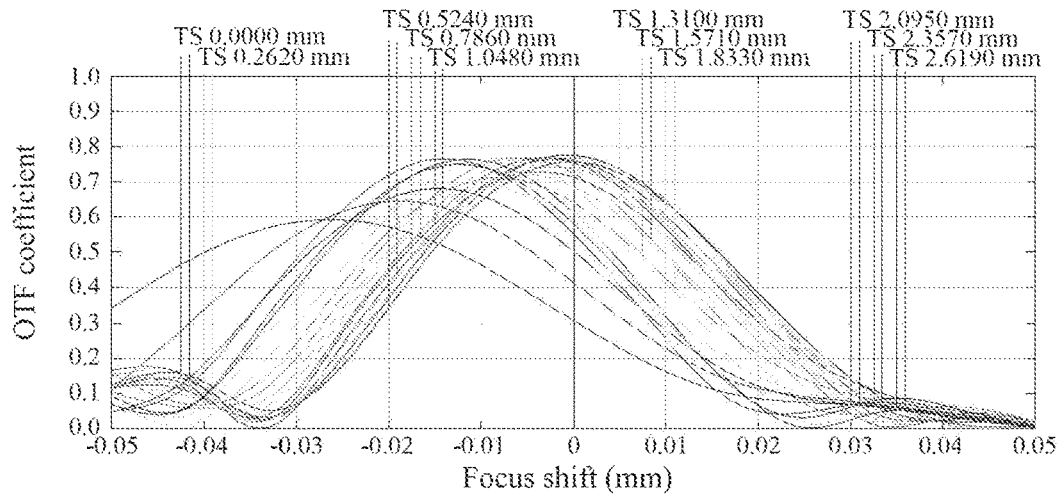
FIG. 4A and FIG. 4B respectively illustrate a focus shift curve diagram and an MTF curve diagram of the optical imaging lens assembly in Example 1 when a distance from the object is 150 mm, within a waveband range of 470 nm to 650 nm.
Figure 4B:
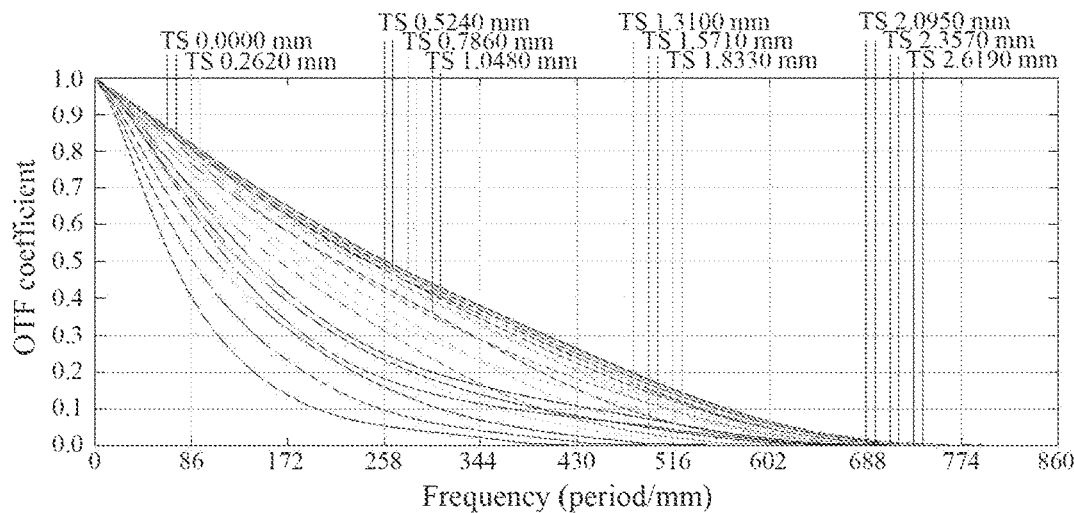
Figure 5A:
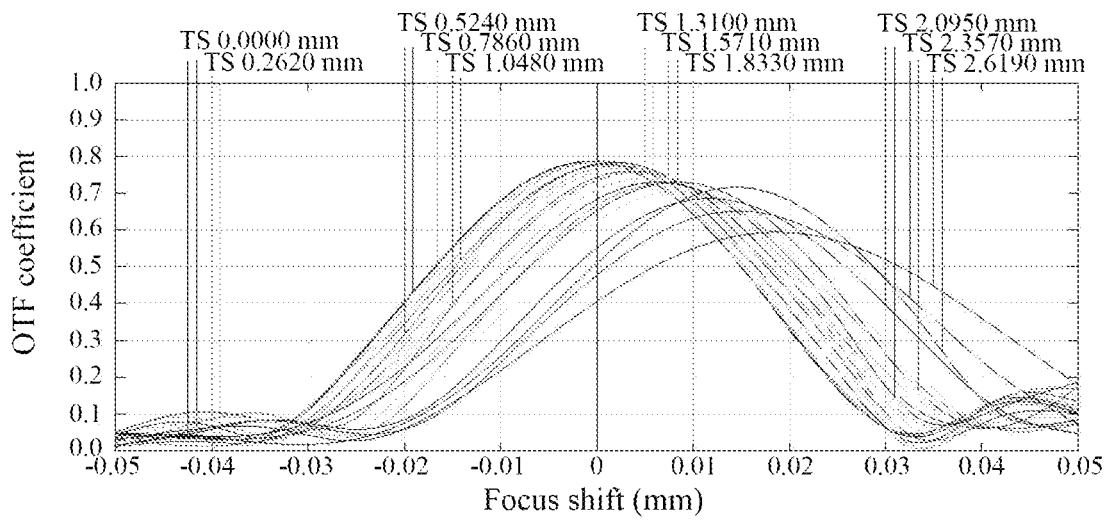
FIG. 5A and FIG. 5B respectively illustrate a focus shift curve diagram and an MTF curve diagram of the optical imaging lens assembly in Example 1 when a distance from the object is infinite, within a waveband range of 470 nm to 650 nm.
Figure 5B:
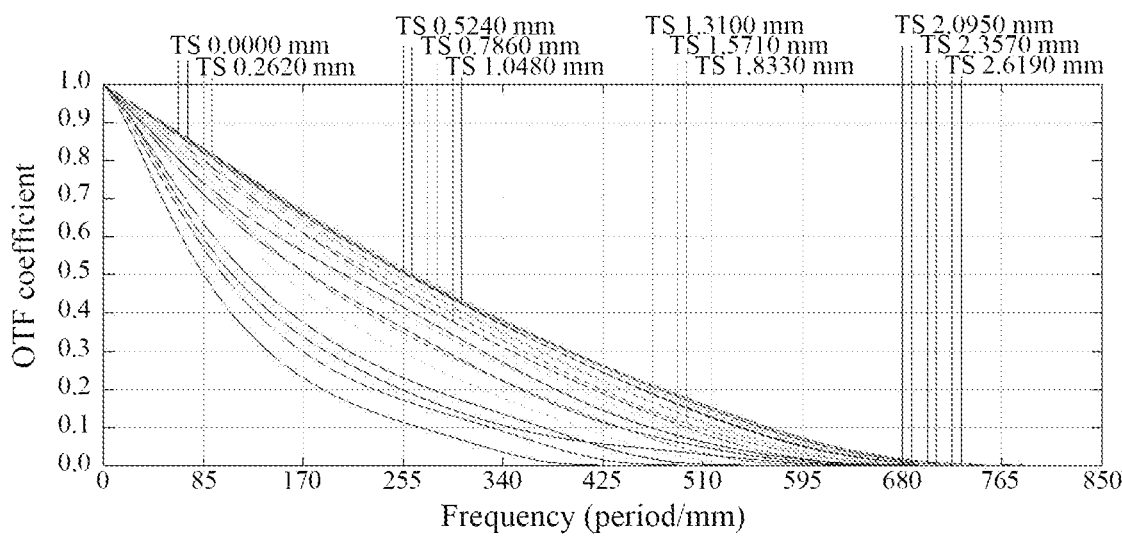

FIG. 2A illustrates the longitudinal aberration curve of the optical imaging lens assembly according to Example 1, representing deviations of focal points converged by light of different wavelengths after passing through the lens assembly. FIG. 2B illustrates the astigmatic curve of the optical imaging lens assembly according to Example 1, representing a curvature of a tangential plane and a curvature of a sagittal plane. FIG. 2C illustrates the distortion curve of the optical imaging lens assembly according to Example 1, representing the amounts of distortion corresponding to different image heights. FIG. 2D illustrates the lateral color curve of the optical imaging lens assembly according to Example 1, representing deviations of different image heights on an imaging plane after light passes through the lens assembly. FIG. 3A, FIG. 4A and FIG. 5A respectively illustrate focus shift curve diagrams of the optical imaging lens assembly in Example 1, when the distance from the object is 350 mm, 150 mm and infinite, within a waveband range of 470 nm to 650 nm of the optical imaging lens assembly, representing the pixel size of a tangential field-of-view and a sagittal field-of-view under different focal shifts (that is, a difference between the actual focal length and a theoretical focal length). FIG. 3B, FIG. 4B and FIG. 5B respectively illustrate MTF curve diagrams of the optical imaging lens assembly in Example 1, when the distance from the object is 350 mm, 150 mm and infinite, within a waveband range of 470 nm to 650 nm of the optical imaging lens assembly, representing the pixel size of a tangential field-of-view and a sagittal field-of-view at different frequencies. It can be seen from FIG. 2A to FIG. 5B that the optical imaging lens assembly provided in Example 1 can achieve good imaging quality.

Example 2

An optical imaging lens assembly according to Example 2 of the present disclosure is described below with reference to FIG. 6 to FIG. 10B. In this example and the following examples, for the purpose of brevity, the description of parts similar to those in Example 1 will be omitted. FIG. 6 illustrates a schematic structural diagram of the optical imaging lens assembly according to Example 2 of the present disclosure.

As shown in FIG. 6, the optical imaging lens assembly from an object side to an image side sequentially includes: a diaphragm STO, a first lens E1, an autofocus assembly T (including a flexible film, a liquid material, and a light-transmitting module), a second lens E2, a third lens E3, a fourth lens E4, a fifth lens E5, an optical filter E6 and an imaging plane S13.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a concave surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has positive refractive power, an object-side surface S7 of the fourth lens is a concave surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The optical filter E6 has an object-side surface S11 and an image-side surface S12. Light from an object sequentially passes through the surfaces S1 to S12 and is finally imaged on the imaging plane S13.

In this example, the total effective focal length f of the optical imaging lens assembly is 4.98 mm, the total track length TTL of the optical imaging lens assembly is 5.63 mm, half of a diagonal length ImgH of an effective pixel area on the imaging plane S13 of the optical imaging lens assembly is 2.77 mm, half of a maximum field-of-view Semi-FOV of the optical imaging lens assembly is 27.9°, and an F number Fno of the optical imaging lens assembly is 2.48.

Table 3 is a table illustrating basic parameters of the optical imaging lens assembly of Example 2, where the units for the radius of curvature, the thickness/distance and the focal length are millimeter (mm). Table 4 shows high-order coefficients applicable to each aspheric surface in Example 2, where the surface shape of each aspheric surface may be defined by the formula (1) given in the above Example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| STO | Spherical | infinite | −0.3192 | | | | |
| S1 | Aspheric | 1.6880 | 0.5763 | 1.55 | 56.1 | 3.19 | −0.0090 |
| S2 | Aspheric | 50.0000 | 0.0978 | | | | 90.0000 |
| | Spherical | RT | 0.0200 | 1.53 | 65.4 | | |
| | Spherical | | 0.2650 | 1.55 | 29.9 | | |
| | Spherical | infinite | 0.1000 | 1.52 | 64.2 | | |
| | Spherical | infinite | 0.1628 | | | | |
| S3 | Aspheric | −2.6383 | 0.2000 | 1.67 | 20.4 | −3.74 | −0.0941 |
| S4 | Aspheric | 47.0376 | 0.3260 | | | | −90.0000 |
| S5 | Aspheric | 10.1628 | 0.5213 | 1.64 | 23.5 | 8.42 | 32.6369 |
| S6 | Aspheric | −11.4192 | 0.7207 | | | | −8.1818 |
| S7 | Aspheric | −5.2522 | 0.6419 | 1.55 | 56.1 | 3.22 | −0.7915 |
| S8 | Aspheric | −1.3725 | 0.2300 | | | | −0.9473 |
| S9 | Aspheric | 3.2651 | 0.2132 | 1.54 | 55.8 | −2.46 | 0.0000 |
| S10 | Aspheric | 0.9190 | 0.4672 | | | | −1.0000 |
| S11 | Spherical | infinite | 0.2100 | 1.52 | 64.2 | | |
| S12 | Spherical | infinite | 0.8825 | | | | |
| S13 | Spherical | infinite | | | | | |

In this example, an image-side surface of the liquid material and the light-transmitting module may be glued together. By changing the radius of curvature of a flexible film surface of the autofocus assembly T and the radius of curvature of the image-side surface of the liquid material, the total effective focal length of the optical imaging lens assembly may be changed with the change of a distance from the object, thereby realizing the autofocus function of the optical imaging lens assembly. Specifically, when the distance D1 between the optical imaging lens assembly and the object is 350 mm, the object-side surface of the autofocus assembly T is a plane surface, and the radius of curvature RT is infinite. When the distance D1 between the optical imaging lens assembly and the object is 150 mm, the object-side surface of the autofocus assembly T is a convex surface, and the radius of curvature RT is 125.5000. When the distance D1 between the optical imaging lens assembly and the object is infinite, the object-side surface of the autofocus assembly T is a concave surface, and the radius of curvature RT is −169.6000.

TABLE 4

| Surface number | A4 | A6 | A8 | A10 | A12 | A14 | A16 |
|---|---|---|---|---|---|---|---|
| S1 | −9.7453E−03 | −2.4753E−03 | −6.2225E−04 | −1.3737E−04 | −3.0070E−05 | −5.4903E−06 | −1.6100E−06 |
| S2 | −9.7204E−03 | −2.1131E−03 | −4.0298E−04 | −5.6358E−05 | −1.0443E−05 | −6.9243E−07 | −5.5829E−07 |
| S3 | 6.4689E−02 | −2.8664E−03 | 3.9804E−04 | 8.7333E−06 | −6.7431E−06 | 7.1639E−06 | −4.6286E−06 |
| S4 | 6.8458E−02 | −1.0146E−03 | 7.9526E−04 | 1.7567E−04 | 4.2620E−05 | 1.9896E−05 | 1.2773E−06 |
| S5 | −1.8075E−01 | −5.1158E−03 | 8.8748E−04 | 1.3995E−04 | 6.9895E−04 | 2.8484E−04 | 8.2004E−05 |
| S6 | −2.1837E−01 | 9.7412E−03 | 4.3518E−03 | 1.7641E−03 | 5.0003E−04 | 2.9464E−05 | −5.3580E−05 |
| S7 | 1.6834E−01 | 4.9418E−02 | −1.5696E−02 | 1.5549E−03 | 2.3354E−03 | −1.2231E−03 | 6.1945E−04 |
| S8 | 1.0024E+00 | −5.8139E−02 | −3.7046E−03 | −3.3188E−03 | 8.6422E−03 | −3.8805E−03 | 1.7015E−03 |
| S9 | −1.6255E+00 | 5.2620E−01 | −2.0054E−01 | 5.5938E−02 | −2.2406E−02 | 1.1085E−02 | −5.7368E−03 |
| S10 | −3.4877E+00 | 8.6193E−01 | −2.6167E−01 | 9.9902E−02 | −5.1081E−02 | 2.2298E−02 | −1.0245E−02 |

| Surface number | A18 | A20 |
|---|---|---|
| S1 | −5.1850E−07 | −4.8846E−07 |
| S2 | −1.2332E−07 | −2.9363E−07 |
| S3 | 3.0560E−06 | −3.1677E−06 |
| S4 | 3.5548E−06 | −1.3858E−06 |
| S5 | 7.7102E−06 | −1.4416E−05 |
| S6 | −5.6784E−05 | −3.2892E−05 |
| S7 | −1.3205E−04 | −1.9262E−04 |
| S8 | −1.2727E−03 | −4.2896E−04 |
| S9 | −5.3883E−04 | 1.9621E−04 |
| S10 | 4.8516E−03 | −2.9107E−03 |

Figures 7C, 7D:
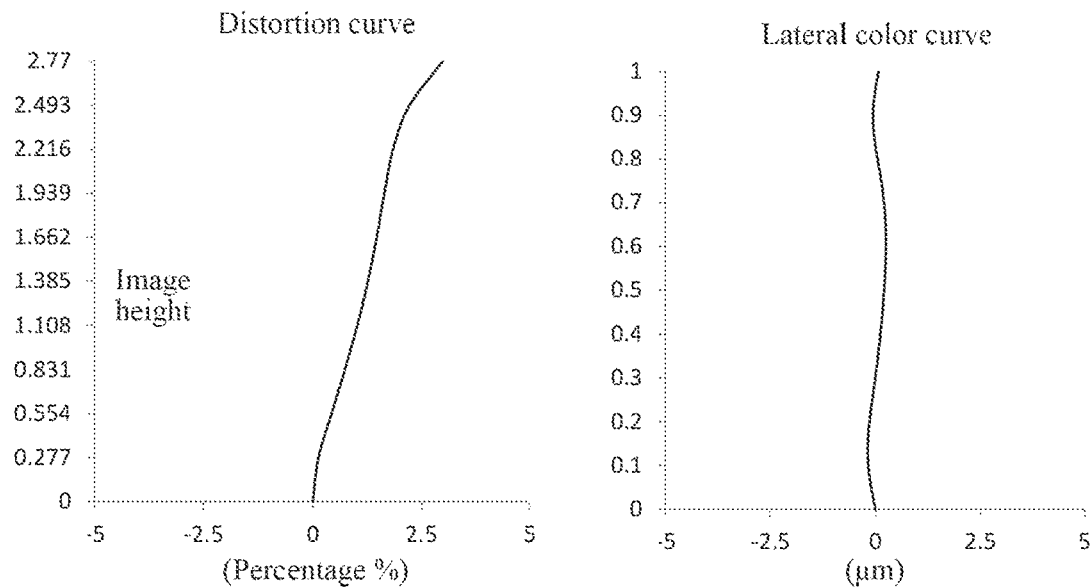
Figure 8A:
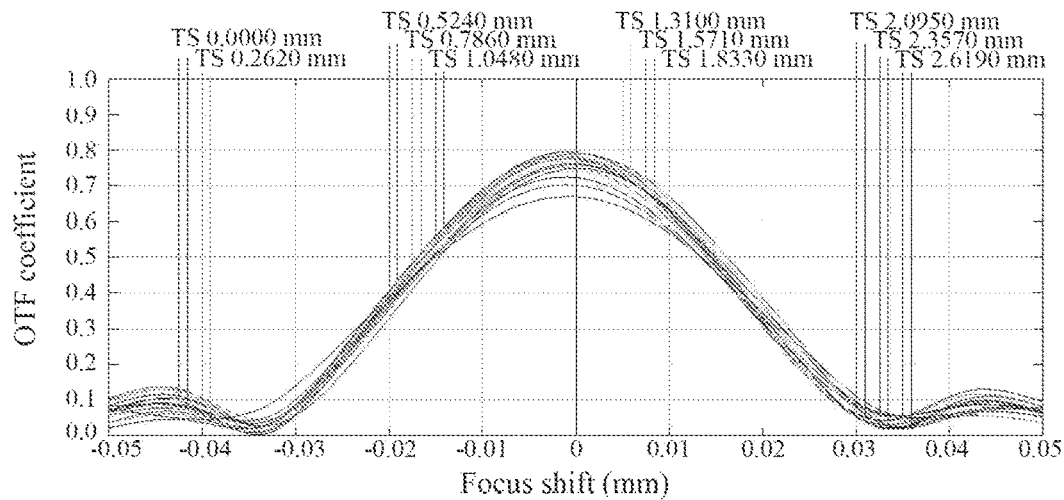
FIG. 8A and FIG. 8B respectively illustrate a focus shift curve diagram and an MTF curve diagram of the optical imaging lens assembly in Example 2 when a distance from the object is 350 mm, within a waveband range of 470 nm to 650 nm.
Figure 8B:
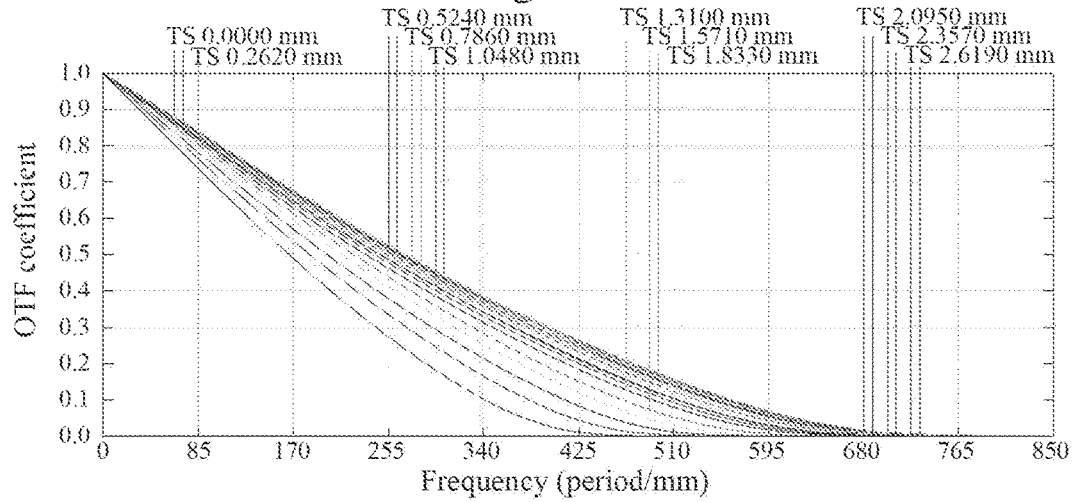
Figure 9A:
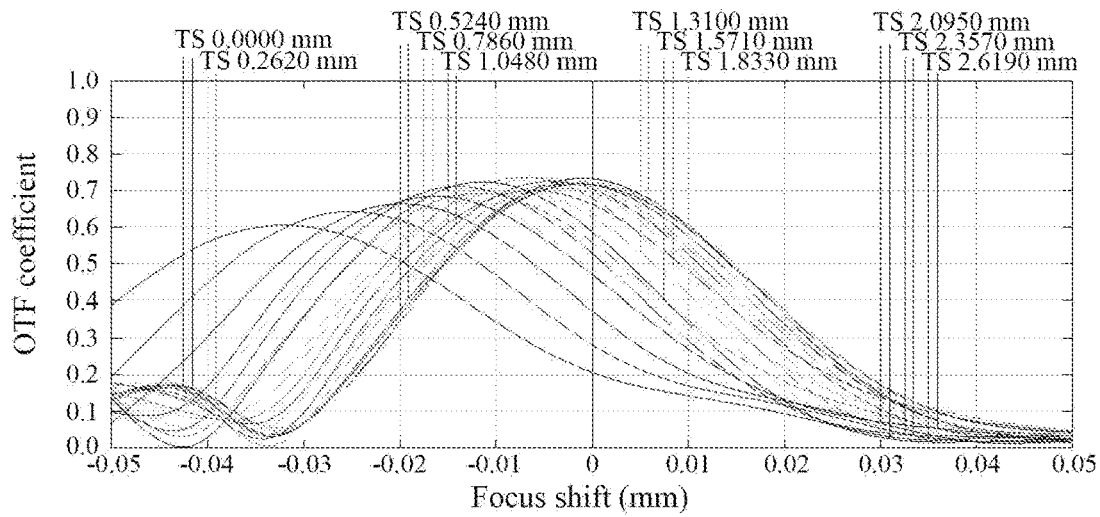
FIG. 9A and FIG. 9B respectively illustrate a focus shift curve diagram and an MTF curve diagram of the optical imaging lens assembly in Example 2 when a distance from the object is 150 mm, within a waveband range of 470 nm to 650 nm.
Figure 9B:
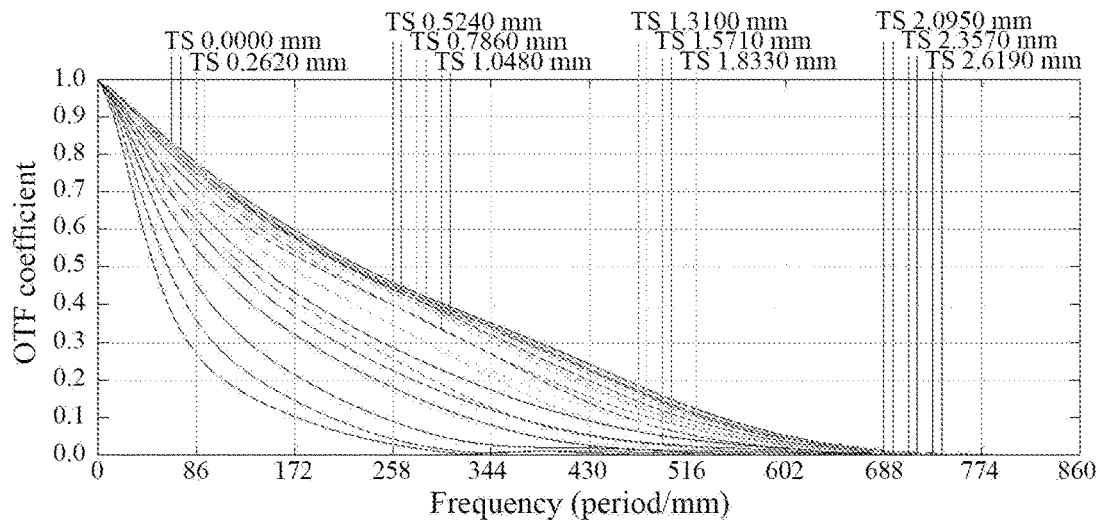
Figure 10A:
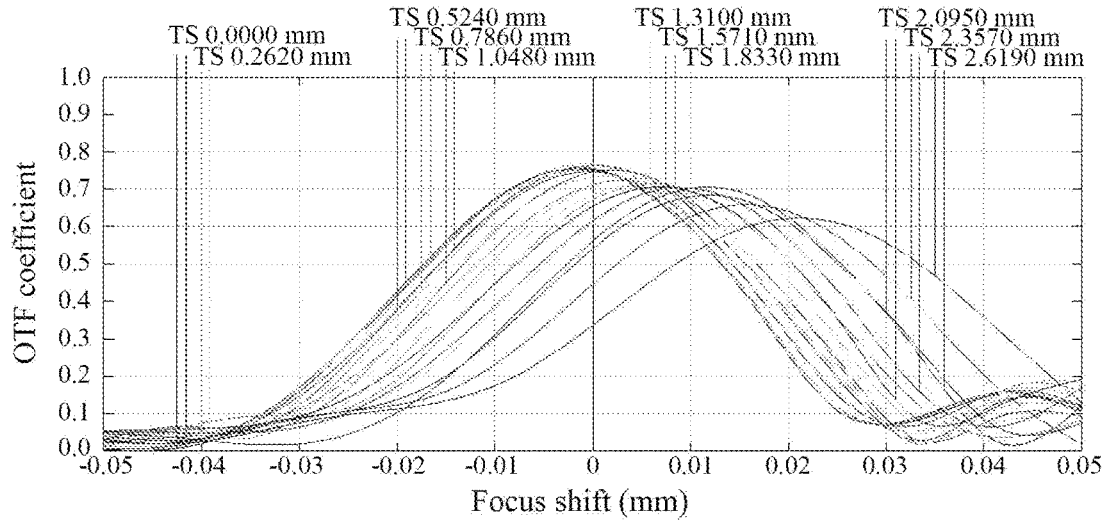
FIG. 10A and FIG. 10B respectively illustrate a focus shift curve diagram and an MTF curve diagram of the optical imaging lens assembly in Example 2 when a distance from the object is infinite, within a waveband range of 470 nm to 650 nm.
Figure 10B:
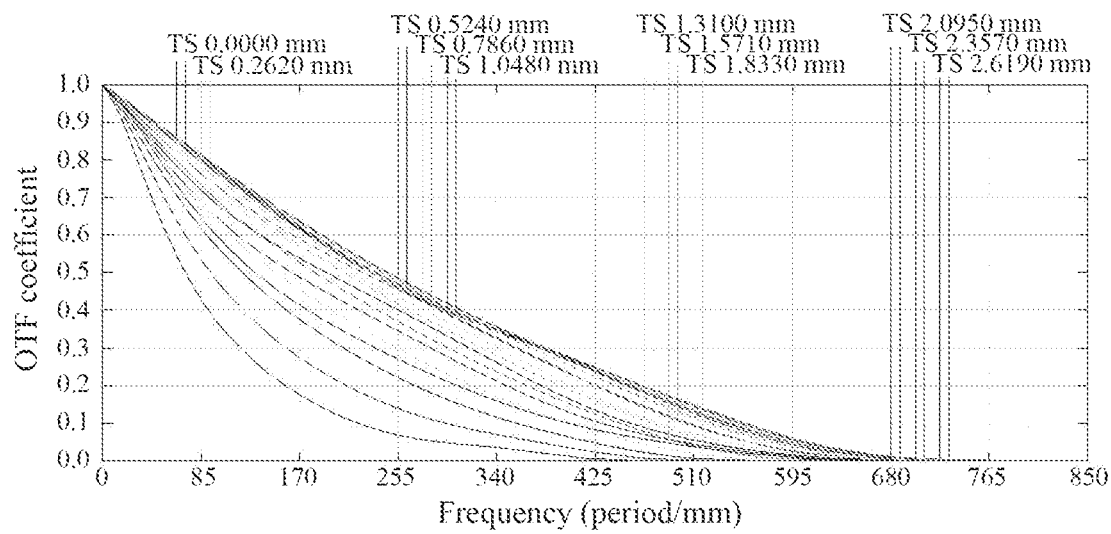

FIG. 7A illustrates the longitudinal aberration curve of the optical imaging lens assembly according to Example 2, representing deviations of focal points converged by light of different wavelengths after passing through the lens assembly. FIG. 7B illustrates the astigmatic curve of the optical imaging lens assembly according to Example 2, representing a curvature of a tangential plane and a curvature of a sagittal plane. FIG. 7C illustrates the distortion curve of the optical imaging lens assembly according to Example 2, representing the amounts of distortion corresponding to different image heights. FIG. 7D illustrates the lateral color curve of the optical imaging lens assembly according to Example 2, representing deviations of different image heights on an imaging plane after light passes through the lens assembly. FIG. 8A, FIG. 9A and FIG. 10A respectively illustrate focus shift curve diagrams of the optical imaging lens assembly in Example 2, when the distance from the object is 350 mm, 150 mm and infinite, within a waveband range of 470 nm to 650 nm of the optical imaging lens assembly, representing the pixel size of a tangential field-of-view and a sagittal field-of-view under different focal shifts. FIG. 8B, FIG. 9B and FIG. 10B respectively illustrate MTF curve diagrams of the optical imaging lens assembly in Example 2, when the distance from the object is 350 mm, 150 mm and infinite, within a waveband range of 470 nm to 650 nm of the optical imaging lens assembly, representing the pixel size of a tangential field-of-view and a sagittal field-of-view at different frequencies. It can be seen from FIG. 7A to FIG. 10B that the optical imaging lens assembly provided in Example 2 can achieve good imaging quality.

Example 3

Figure 11:
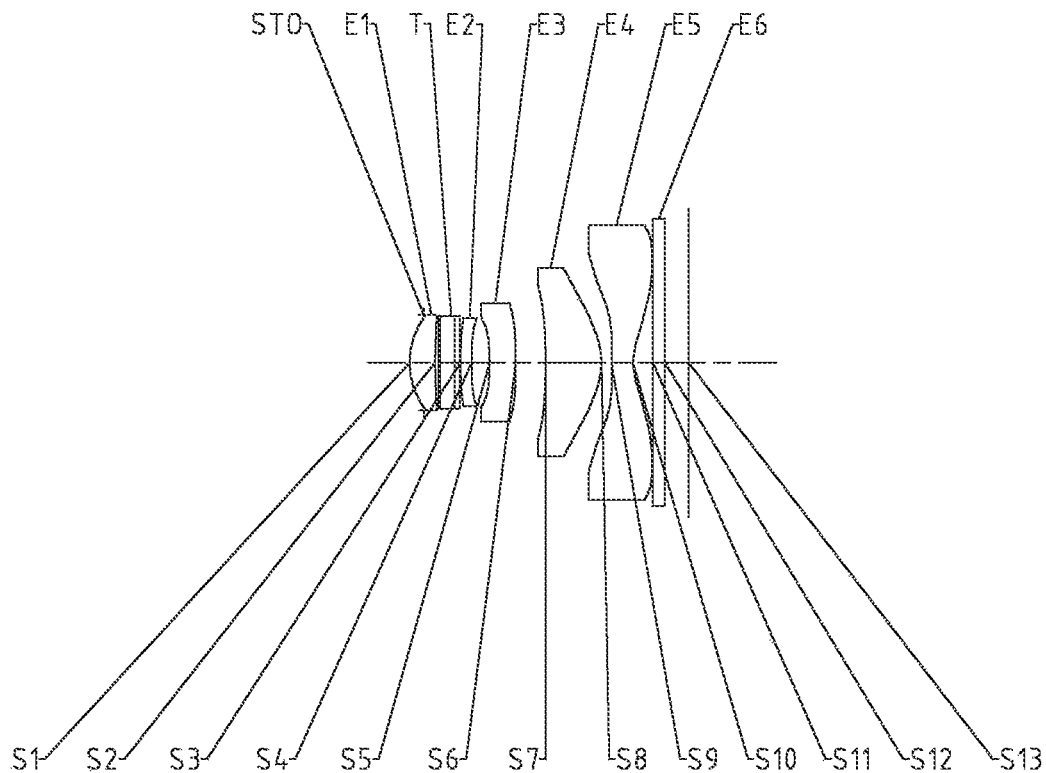
FIG. 11 is a schematic structural diagram illustrating an optical imaging lens assembly according to Example 3 of the present disclosure.

An optical imaging lens assembly according to Example 3 of the present disclosure is described below with reference to FIG. 11 to FIG. 15B. FIG. 11 illustrates a schematic structural diagram of the optical imaging lens assembly according to Example 3 of the present disclosure.

As shown in FIG. 11, the optical imaging lens assembly from an object side to an image side sequentially includes: a diaphragm STO, a first lens E1, an autofocus assembly T (including a flexible film, a liquid material, and a light-transmitting module), a second lens E2, a third lens E3, a fourth lens E4, a fifth lens E5, an optical filter E6 and an imaging plane S13.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a concave surface, and an image-side surface S6 of the third lens is a convex surface. The fourth lens E4 has positive refractive power, an object-side surface S7 of the fourth lens is a concave surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The optical filter E6 has an object-side surface S11 and an image-side surface S12. Light from an object sequentially passes through the surfaces S1 to S12 and is finally imaged on the imaging plane S13.

In this example, the total effective focal length f of the optical imaging lens assembly is 4.05 mm, the total track length TTL of the optical imaging lens assembly is 5.01 mm, half of a diagonal length ImgH of an effective pixel area on the imaging plane S13 of the optical imaging lens assembly is 2.77 mm, half of a maximum field-of-view Semi-FOV of the optical imaging lens assembly is 33.6°, and an F number Fno of the optical imaging lens assembly is 2.48.

Table 5 is a table illustrating basic parameters of the optical imaging lens assembly of Example 3, where the units for the radius of curvature, the thickness/distance and the focal length are millimeter (mm). Table 6 shows high-order coefficients applicable to each aspheric surface in Example 3, where the surface shape of each aspheric surface may be defined by the formula (1) given in the above Example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| STO | Spherical | infinite | −0.2576 | | | | |
| S1 | Aspheric | 1.3947 | 0.4546 | 1.55 | 56.1 | 3.22 | −0.1236 |
| S2 | Aspheric | 5.9741 | 0.0666 | | | | −83.8336 |
| | Spherical | RT | 0.0200 | 1.53 | 65.4 | | |
| | Spherical | | 0.2650 | 1.55 | 29.9 | | |
| | Spherical | infinite | 0.1000 | 1.52 | 64.2 | | |
| | Spherical | infinite | 0.0100 | | | | |
| S3 | Aspheric | 30.0000 | 0.2000 | 1.67 | 20.4 | −22.60 | −87.5651 |
| S4 | Aspheric | 10.0000 | 0.3248 | | | | −87.9503 |
| S5 | Aspheric | −5.1515 | 0.4676 | 1.64 | 23.5 | −11.11 | 22.0372 |
| S6 | Aspheric | −19.0000 | 0.5408 | | | | −89.8086 |
| S7 | Aspheric | −9.3447 | 0.9990 | 1.55 | 56.1 | 2.79 | 33.9537 |
| S8 | Aspheric | −1.3579 | 0.1775 | | | | −0.8045 |
| S9 | Aspheric | 4.6410 | 0.3865 | 1.54 | 55.8 | −2.22 | 0.5328 |
| S10 | Aspheric | 0.9197 | 0.3603 | | | | −1.0163 |
| S11 | Spherical | infinite | 0.2100 | 1.52 | 64.2 | | |
| S12 | Spherical | infinite | 0.4306 | | | | |
| S13 | Spherical | infinite | | | | | |

In this example, an image-side surface of the liquid material and the light-transmitting module may be glued together. By changing the radius of curvature of a flexible film surface of the autofocus assembly T and the radius of curvature of the image-side surface of the liquid material, the total effective focal length of the optical imaging lens assembly may be changed with the change of a distance from the object, thereby realizing the autofocus function of the optical imaging lens assembly. Specifically, when the distance D1 between the optical imaging lens assembly and the object is 350 mm, the object-side surface of the autofocus assembly T is a plane surface, and the radius of curvature RT is infinite. When the distance D1 between the optical imaging lens assembly and the object is 150 mm, the object-side surface of the autofocus assembly T is a convex surface, and the radius of curvature RT is 129.0000. When the distance D1 between the optical imaging lens assembly and the object is infinite, the object-side surface of the autofocus assembly T is a concave surface, and the radius of curvature RT is −174.5000.

TABLE 6

| Surface number | A4 | A6 | A8 | A10 | A12 | A14 | A16 |
|---|---|---|---|---|---|---|---|
| S1 | −1.1693E−02 | −8.3297E−03 | −2.0812E−03 | 3.2635E−04 | 6.2454E−04 | 4.0692E−04 | 8.3089E−05 |
| S2 | −2.4967E−02 | −1.4279E−02 | 4.7525E−03 | 3.0801E−03 | 1.4633E−05 | −1.3760E−03 | −1.0180E−03 |
| S3 | 4.0927E−02 | 5.4654E−04 | 1.5137E−03 | 2.6683E−04 | −5.7743E−05 | −6.4331E−05 | −9.2145E−05 |
| S4 | 5.3757E−02 | 3.2615E−03 | 2.5805E−03 | 3.8463E−04 | −6.7504E−05 | −2.5329E−04 | −2.2811E−04 |
| S5 | −8.6209E−02 | −3.7804E−03 | 2.7890E−03 | 1.6606E−03 | 6.3767E−04 | 1.3733E−04 | −1.3451E−04 |
| S6 | −9.7686E−02 | 5.2818E−03 | 3.3715E−03 | 2.1449E−05 | 3.5776E−04 | 2.3353E−04 | 1.0436E−04 |
| S7 | 8.1815E−03 | −6.2205E−04 | 3.1935E−04 | −5.2323E−03 | 5.7815E−04 | 5.6653E−04 | −1.8138E−04 |

TABLE 6-continued

| | | | | | | | |
|---|---|---|---|---|---|---|---|
| S8 | 5.5389E-01 | -2.9672E-02 | 1.6430E-03 | -1.5810E-02 | 4.4420E-04 | 2.4200E-03 | 1.5207E-04 |
| S9 | -1.1122E+00 | 3.1803E-01 | -9.8542E-02 | 1.9913E-02 | -5.9251E-03 | 7.8938E-03 | -2.8906E-03 |
| S10 | -3.2723E+00 | 6.7946E-01 | -2.3471E-01 | 8.3168E-02 | -4.0898E-02 | 1.9289E-02 | -8.7001E-03 |

| Surface number | A18 | A20 |
|---|---|---|
| S1 | -8.8380E-05 | -1.5194E-04 |
| S2 | -9.0483E-05 | 5.4615E-04 |
| S3 | -5.2253E-05 | -4.4442E-05 |
| S4 | -1.9126E-04 | -1.1652E-04 |
| S5 | -1.4348E-04 | -1.0920E-04 |
| S6 | 1.9131E-05 | 5.0645E-06 |
| S7 | -4.5486E-04 | -1.1227E-04 |
| S8 | -1.5751E-03 | -4.9761E-04 |
| S9 | -5.3600E-04 | -3.0487E-04 |
| S10 | 4.5177E-03 | -1.9345E-03 |

Figure 12A:
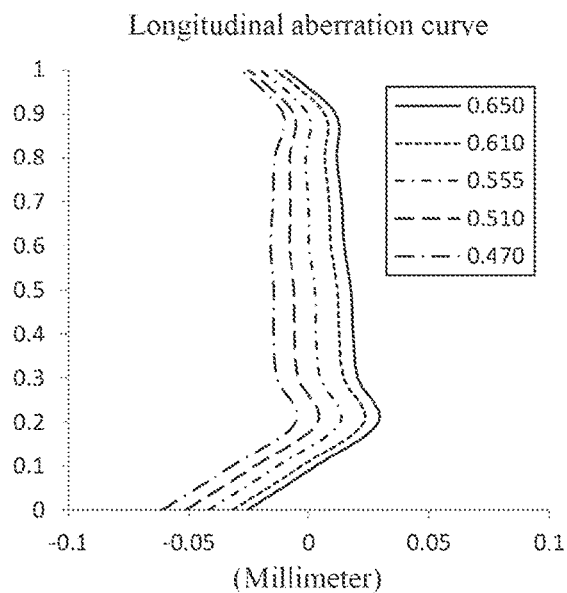
FIGS. 12A-12D respectively illustrate a longitudinal aberration curve, an astigmatic curve, a distortion curve and a lateral color curve of the optical imaging lens assembly according to Example 3.
Figure 12B:
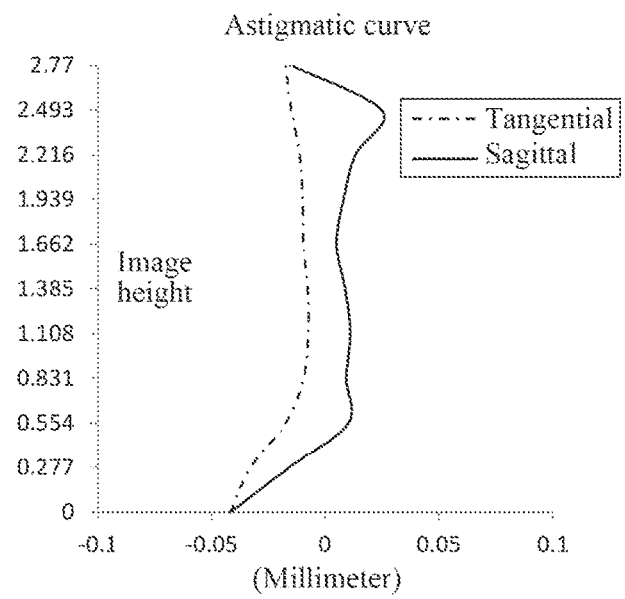
Figure 12C:
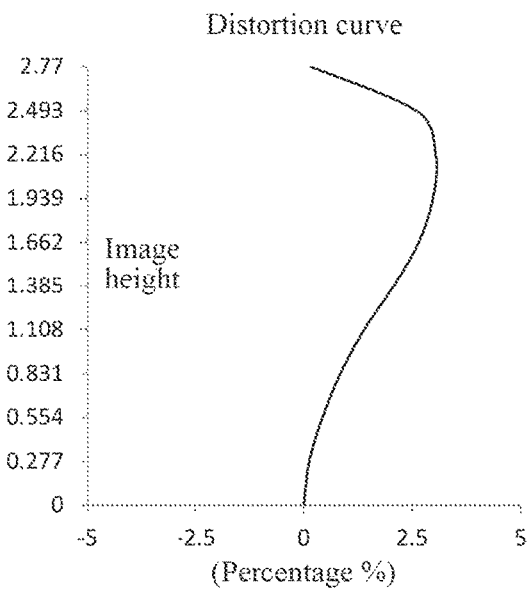
Figure 12D:
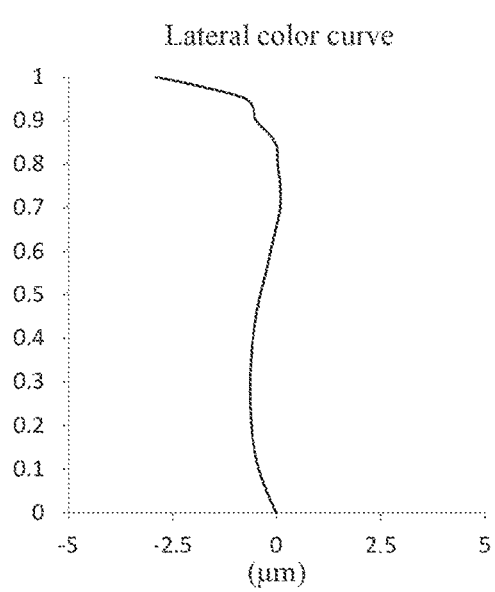
Figure 13A:
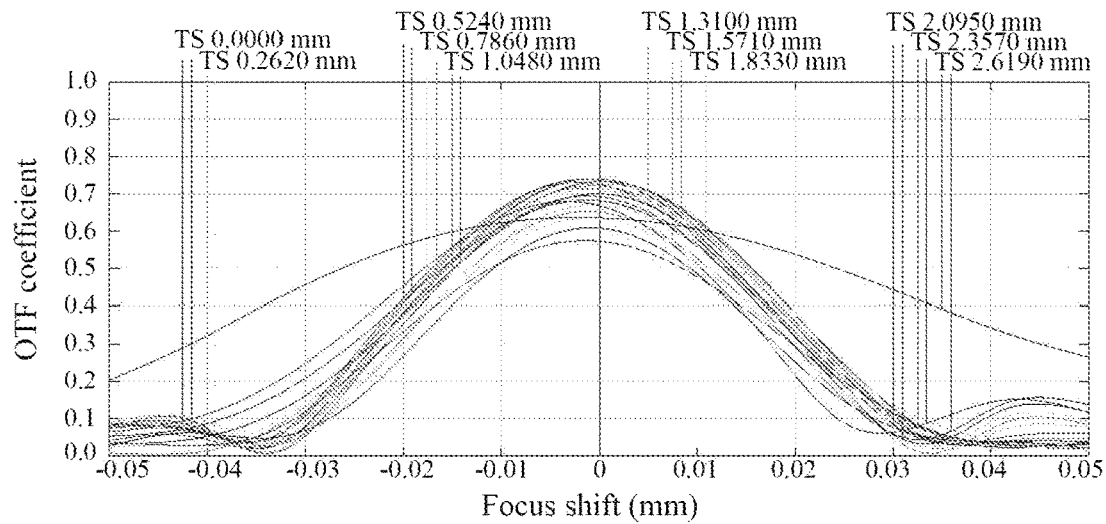
FIG. 13A and FIG. 13B respectively illustrate a focus shift curve diagram and an MTF curve diagram of the optical imaging lens assembly in Example 3 when a distance from the object is 350 mm, within a waveband range of 470 nm to 650 nm.
Figure 13B:
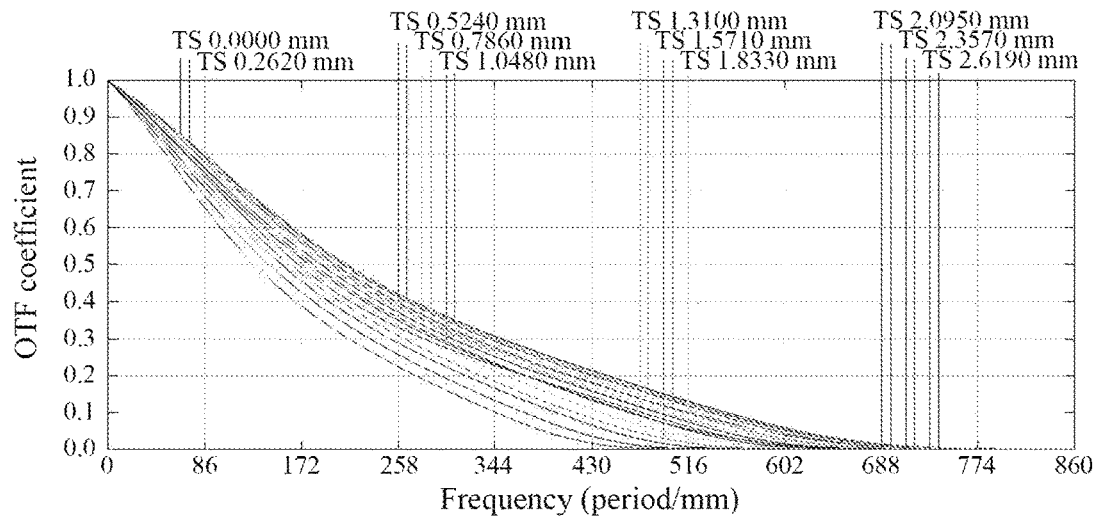
Figure 14A:
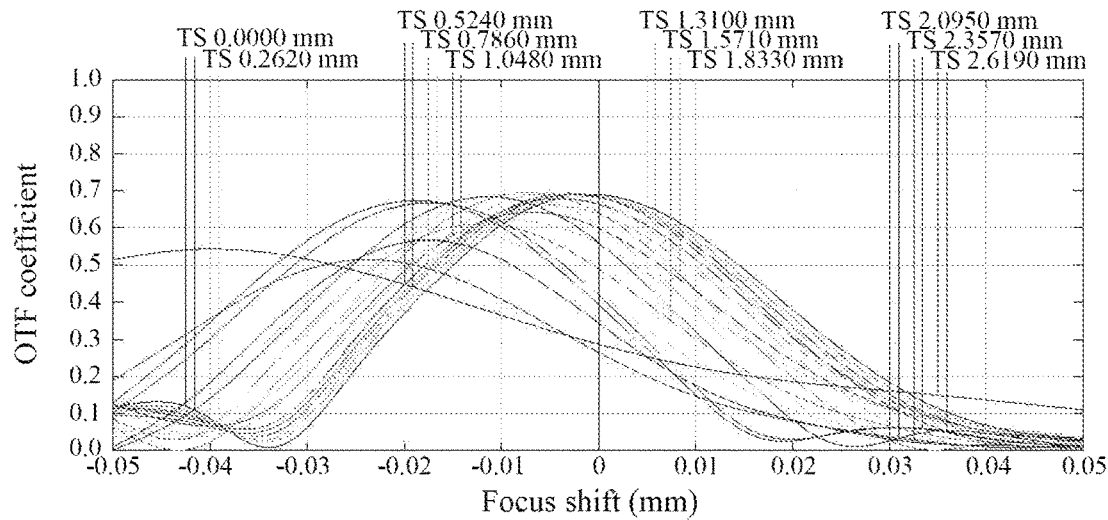
FIG. 14A and FIG. 14B respectively illustrate a focus shift curve diagram and an MTF curve diagram of the optical imaging lens assembly in Example 3 when a distance from the object is 150 mm, within a waveband range of 470 nm to 650 nm.
Figure 14B:
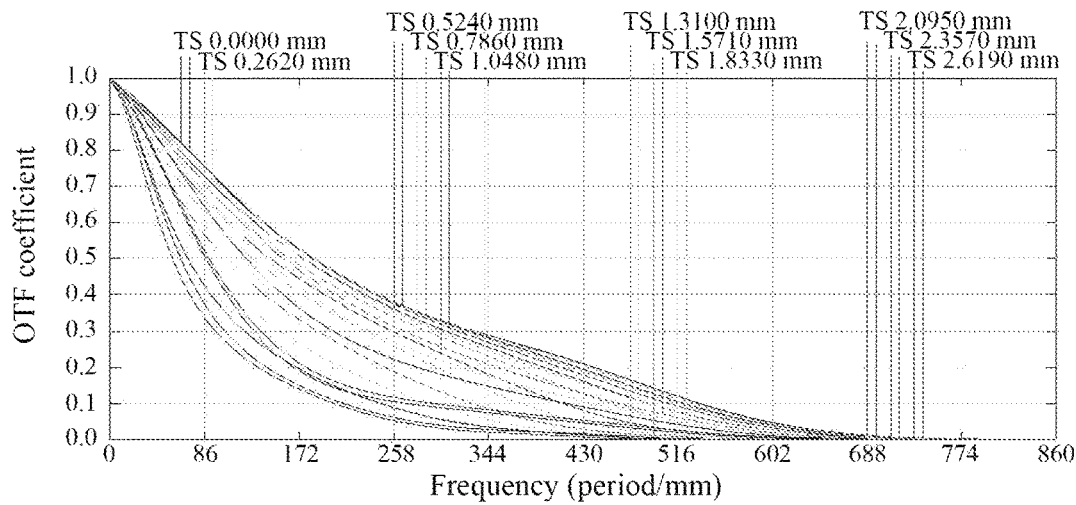
Figure 15A:
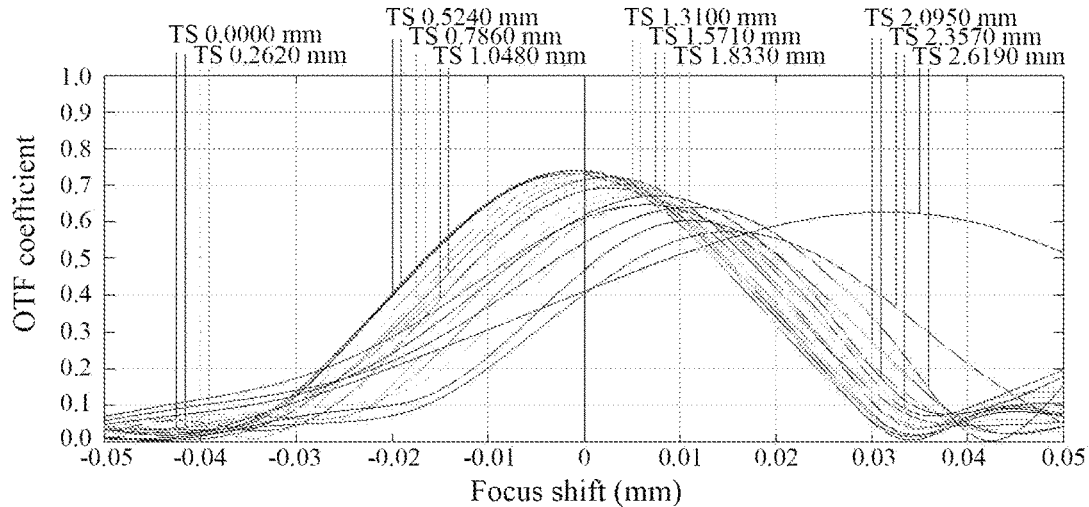
FIG. 15A and FIG. 15B respectively illustrate a focus shift curve diagram and an MTF curve diagram of the optical imaging lens assembly in Example 3 when a distance from the object is infinite, within a waveband range of 470 nm to 650 nm.
Figure 15B:
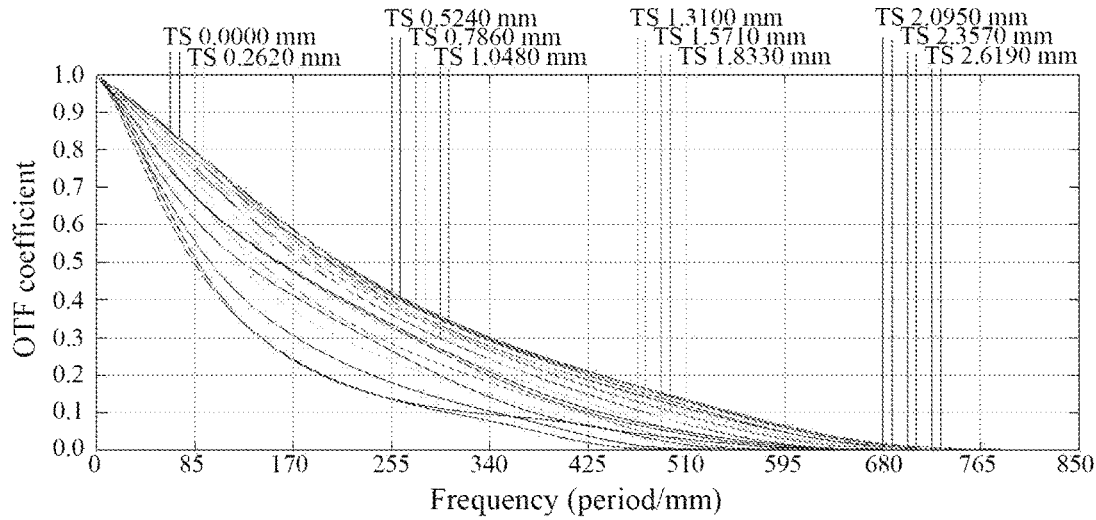

FIG. 12A illustrates the longitudinal aberration curve of the optical imaging lens assembly according to Example 3, representing deviations of focal points converged by light of different wavelengths after passing through the lens assembly. FIG. 12B illustrates the astigmatic curve of the optical imaging lens assembly according to Example 3, representing a curvature of a tangential plane and a curvature of a sagittal plane. FIG. 12C illustrates the distortion curve of the optical imaging lens assembly according to Example 3, representing the amounts of distortion corresponding to different image heights. FIG. 12D illustrates the lateral color curve of the optical imaging lens assembly according to Example 3, representing deviations of different image heights on an imaging plane after light passes through the lens assembly. FIG. 13A, FIG. 14A and FIG. 15A respectively illustrate focus shift curve diagrams of the optical imaging lens assembly in Example 3, when the distance from the object is 350 mm, 150 mm and infinite, within a waveband range of 470 nm to 650 nm of the optical imaging lens assembly, representing the pixel size of a tangential field-of-view and a sagittal field-of-view under different focal shifts. FIG. 13B, FIG. 14B and FIG. 15B respectively illustrate MTF curve diagrams of the optical imaging lens assembly in Example 3, when the distance from the object is 350 mm, 150 mm and infinite, within a waveband range of 470 nm to 650 nm of the optical imaging lens assembly, representing the pixel size of a tangential field-of-view and a sagittal field-of-view at different frequencies. It can be seen from FIG. 12A to FIG. 15B that the optical imaging lens assembly provided in Example 3 can achieve good imaging quality.

Example 4

Figure 16:
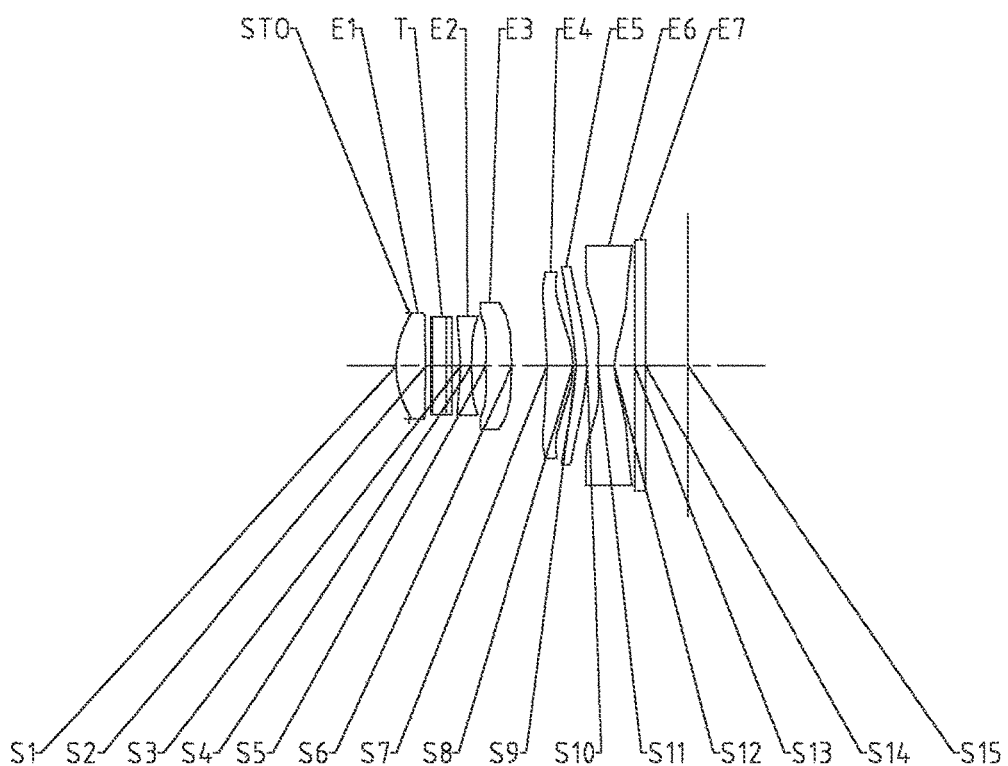
FIG. 16 is a schematic structural diagram illustrating an optical imaging lens assembly according to Example 4 of the present disclosure.

An optical imaging lens assembly according to Example 4 of the present disclosure is described below with reference to FIG. 16 to FIG. 20B. FIG. 16 illustrates a schematic structural diagram of the optical imaging lens assembly according to Example 4 of the present disclosure.

As shown in FIG. 16, the optical imaging lens assembly from an object side to an image side sequentially includes: a diaphragm STO, a first lens E1, an autofocus assembly T (including a flexible film, a liquid material, and a light-transmitting module), a second lens E2, a third lens E3, a fourth lens E4, a fifth lens E5, a sixth lens E6, an optical filter E7 and an imaging plane S15.

The first lens E1 has positive refractive power, an object-side surface S1 of the first lens is a convex surface, and an image-side surface S2 of the first lens is a convex surface. The second lens E2 has negative refractive power, an object-side surface S3 of the second lens is a concave surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has positive refractive power, an object-side surface S7 of the fourth lens is a concave surface, and an image-side surface S8 of the fourth lens is a convex surface. The fifth lens E5 has positive refractive power, an object-side surface S9 of the fifth lens is a concave surface, and an image-side surface S10 of the fifth lens is a convex surface. The sixth lens E6 has negative refractive power, an object-side surface S11 of the sixth lens is a convex surface, and an image-side surface S12 of the sixth lens is a concave surface. The optical filter E7 has an object-side surface S13 and an image-side surface S14. Light from an object sequentially passes through the surfaces S1 to S14 and is finally imaged on the imaging plane S15.

In this example, the total effective focal length f of the optical imaging lens assembly is 4.62 mm, the total track length TTL of the optical imaging lens assembly is 5.41 mm, half of a diagonal length ImgH of an effective pixel area on the imaging plane S15 of the optical imaging lens assembly is 2.77 mm, half of a maximum field-of-view Semi-FOV of the optical imaging lens assembly is 29.7°, and an F number Fno of the optical imaging lens assembly is 2.48.

Table 7 is a table illustrating basic parameters of the optical imaging lens assembly of Example 4, where the units for the radius of curvature, the thickness/distance and the focal length are millimeter (mm). Table 8 shows high-order coefficients applicable to each aspheric surface in Example 4, where the surface shape of each aspheric surface may be defined by the formula (1) given in the above Example 1.

TABLE 7

| Surface number | Surface type | Radius of curvature | Thickness/ Distance | Refractive index | Abbe number | Focal length | Conic coefficient |
|---|---|---|---|---|---|---|---|
| OBJ | Spherical | infinite | D1 | | | | |
| STO | Spherical | infinite | −0.2382 | | | | |
| S1 | Aspheric | 1.7241 | 0.5480 | 1.55 | 56.1 | 3.11 | −0.0904 |
| S2 | Aspheric | −90.9444 | 0.0986 | | | | −90.0000 |
| | Spherical | RT | 0.0200 | 1.53 | 65.4 | | |
| | Spherical | | 0.2650 | 1.55 | 29.9 | | |
| | Spherical | infinite | 0.1000 | 1.52 | 64.2 | | |
| | Spherical | infinite | 0.1636 | | | | |
| S3 | Aspheric | −2.6375 | 0.2000 | 1.67 | 20.4 | −3.36 | −0.0732 |
| S4 | Aspheric | 15.1923 | 0.2605 | | | | −90.0000 |
| S5 | Aspheric | 7.0809 | 0.4942 | 1.64 | 23.5 | 7.41 | 33.5890 |
| S6 | Aspheric | −14.2522 | 0.6512 | | | | −11.0951 |
| S7 | Aspheric | −7.6858 | 0.4787 | 1.55 | 56.1 | 3.40 | −1.7823 |
| S8 | Aspheric | −1.5269 | 0.0590 | | | | −0.9608 |
| S9 | Aspheric | −1.9056 | 0.2000 | 1.55 | 56.1 | 896.44 | −34.7996 |
| S10 | Aspheric | −1.9685 | 0.1999 | | | | −27.8188 |
| S11 | Aspheric | 2.9367 | 0.2999 | 1.54 | 55.8 | −2.59 | 0.0022 |
| S12 | Aspheric | 0.9100 | 0.3749 | | | | −0.9848 |
| S13 | Spherical | infinite | 0.2100 | 1.52 | 64.2 | | |
| S14 | Spherical | infinite | 0.7820 | | | | |
| S15 | Spherical | infinite | | | | | |

In this example, an image-side surface of the liquid material and the light-transmitting module may be glued together. By changing the radius of curvature of a flexible film surface of the autofocus assembly T and the radius of curvature of the image-side surface of the liquid material, the total effective focal length of the optical imaging lens assembly may be changed with the change of a distance from the object, thereby realizing the autofocus function of the optical imaging lens assembly. Specifically, when the distance D1 between the optical imaging lens assembly and the object is 350 mm, the object-side surface of the autofocus assembly T is a plane surface, and the radius of curvature RT is infinite. When the distance D1 between the optical imaging lens assembly and the object is 150 mm, the object-side surface of the autofocus assembly T is a convex surface, and the radius of curvature RT is 123.3000. When the distance D1 between the optical imaging lens assembly and the object is infinite, the object-side surface of the autofocus assembly T is a concave surface, and the radius of curvature RT is −167.5000.

TABLE 8

| Surface number | A4 | A6 | A8 | A10 | A12 | A14 | A16 |
|---|---|---|---|---|---|---|---|
| S1 | −1.2785E−02 | −3.5185E−03 | −9.1802E−04 | −2.0817E−04 | −4.7609E−05 | −4.8811E−06 | 1.6199E−06 |
| S2 | −1.2284E−02 | −2.9294E−03 | −5.2041E−04 | −1.4259E−05 | 6.2241E−05 | 6.9920E−05 | 6.2336E−05 |
| S3 | 8.0409E−02 | −4.3912E−03 | 5.7938E−04 | −3.5760E−05 | 9.9696E−06 | −2.2080E−06 | 7.4483E−07 |
| S4 | 7.9719E−02 | −1.2855E−03 | 7.8020E−04 | 1.2068E−04 | 4.8272E−05 | 3.6570E−07 | −4.5901E−07 |
| S5 | −1.5057E−01 | −4.2410E−03 | −2.1793E−04 | 4.4924E−04 | 2.4520E−04 | 7.2613E−05 | 1.3567E−05 |
| S6 | −1.9074E−01 | −9.5293E−05 | 3.1198E−03 | 1.1703E−03 | 3.8791E−04 | −5.5847E−05 | −8.5775E−05 |
| S7 | 9.2537E−02 | 2.1818E−02 | 5.4315E−05 | 1.4891E−04 | 1.0206E−03 | −9.7635E−04 | 7.6973E−05 |
| S8 | 7.5366E−01 | −3.8197E−02 | −4.0152E−04 | −5.1026E−03 | 5.4962E−03 | −2.7736E−03 | 4.5252E−04 |
| S9 | −9.7634E−03 | 5.6606E−04 | −2.0665E−03 | −9.6668E−05 | 2.4851E−04 | 5.7058E−04 | −6.8155E−04 |
| S10 | −2.4846E−02 | 1.9799E−03 | 1.2238E−03 | 3.7258E−05 | 3.5969E−04 | −3.9137E−04 | 6.7683E−04 |
| S11 | −1.1507E+00 | 3.4272E−01 | −1.0337E−01 | 2.9304E−02 | −8.8972E−03 | 2.1092E−03 | −5.1524E−04 |
| S12 | −2.5934E+00 | 5.8471E−01 | −1.7697E−01 | 6.7009E−02 | −2.7755E−02 | 1.1802E−02 | −5.5062E−03 |

| Surface number | A18 | A20 |
|---|---|---|
| S1 | 4.5448E−06 | 3.1353E−06 |
| S2 | 5.0956E−05 | 3.8874E−05 |
| S3 | 7.8261E−07 | −1.0329E−06 |
| S4 | −3.7852E−06 | −3.8257E−06 |
| S5 | −1.1648E−05 | −1.4325E−05 |
| S6 | −8.7421E−05 | −5.0369E−05 |
| S7 | 2.0574E−04 | −6.3400E−06 |
| S8 | 4.6355E−04 | −9.7366E−05 |
| S9 | 3.8964E−04 | −3.0919E−04 |
| S10 | −1.8015E−04 | 4.5780E−04 |
| S11 | 9.5667E−05 | 2.6046E−04 |
| S12 | 2.4630E−03 | −1.1066E−03 |

Figures 17A, 17B:
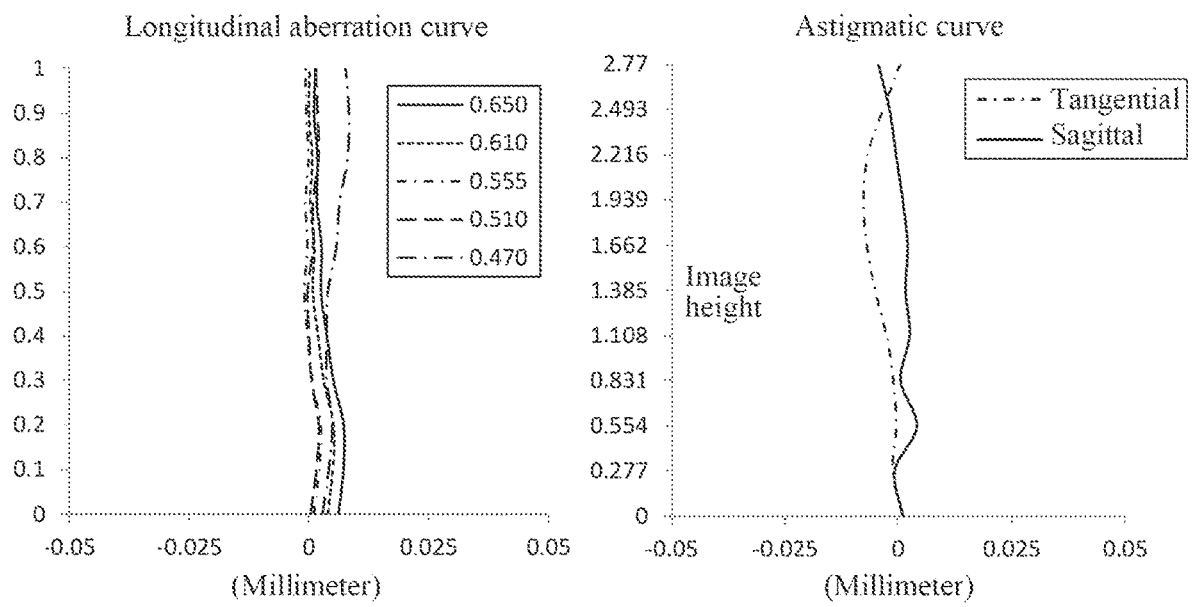
FIGS. 17A-17D respectively illustrate a longitudinal aberration curve, an astigmatic curve, a distortion curve and a lateral color curve of the optical imaging lens assembly according to Example 4.
Figures 17C, 17D:
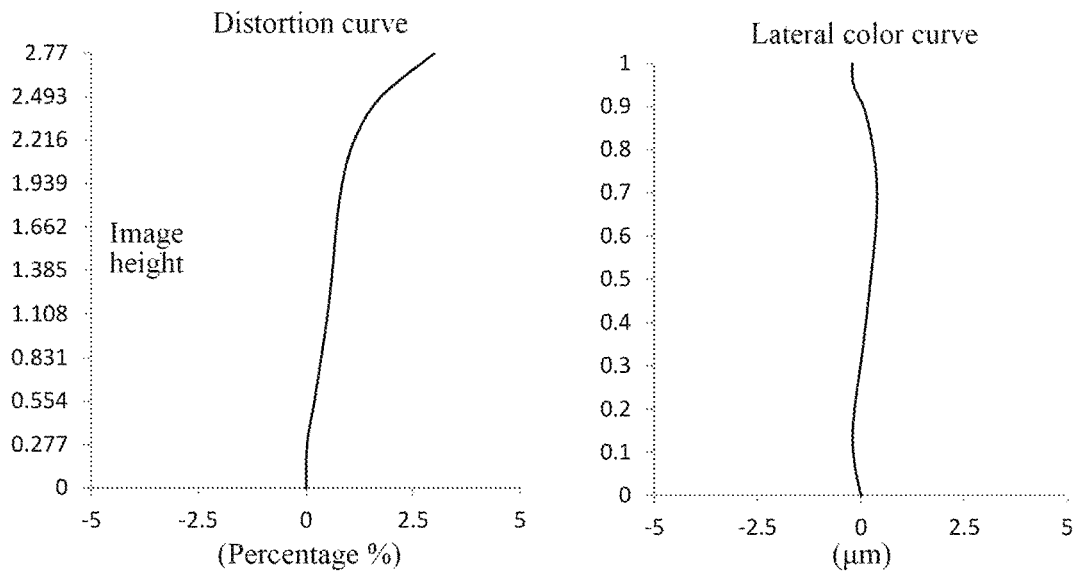
Figure 18A:
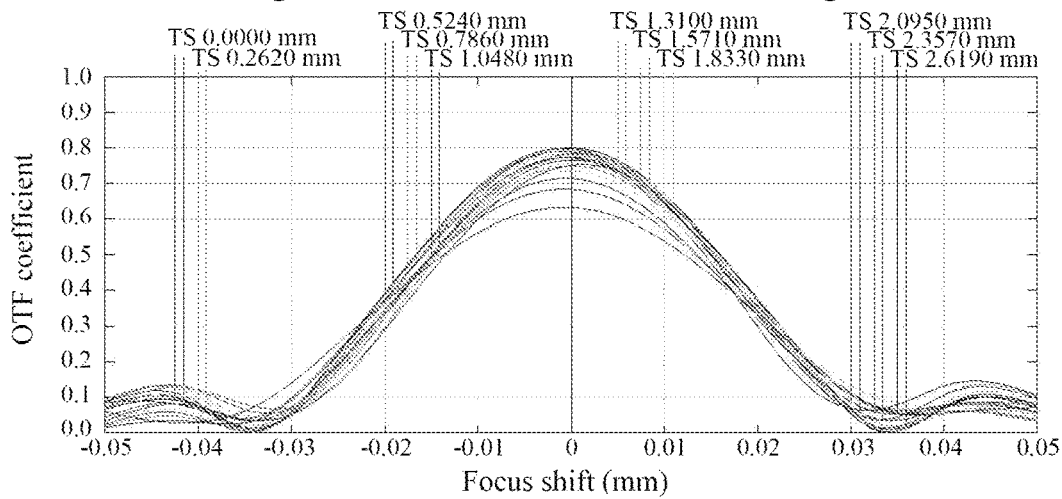
FIG. 18A and FIG. 18B respectively illustrate a focus shift curve diagram and an MTF curve diagram of the optical imaging lens assembly in Example 4 when a distance from the object is 350 mm, within a waveband range of 470 nm to 650 nm.
Figure 18B:
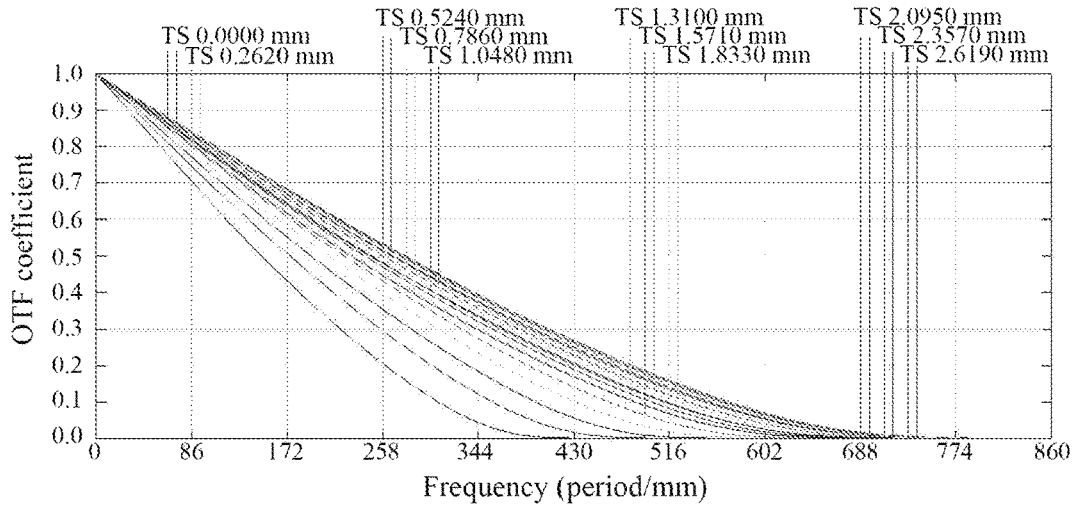
Figure 19A:
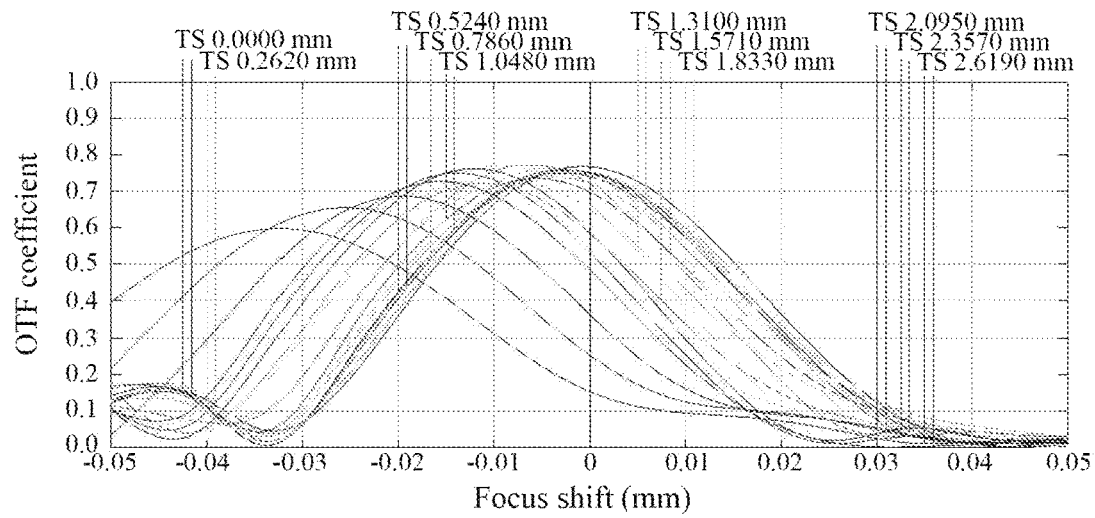
FIG. 19A and FIG. 19B respectively illustrate a focus shift curve diagram and an MTF curve diagram of the optical imaging lens assembly in Example 4 when a distance from the object is 150 mm, within a waveband range of 470 nm to 650 nm.
Figure 19B:
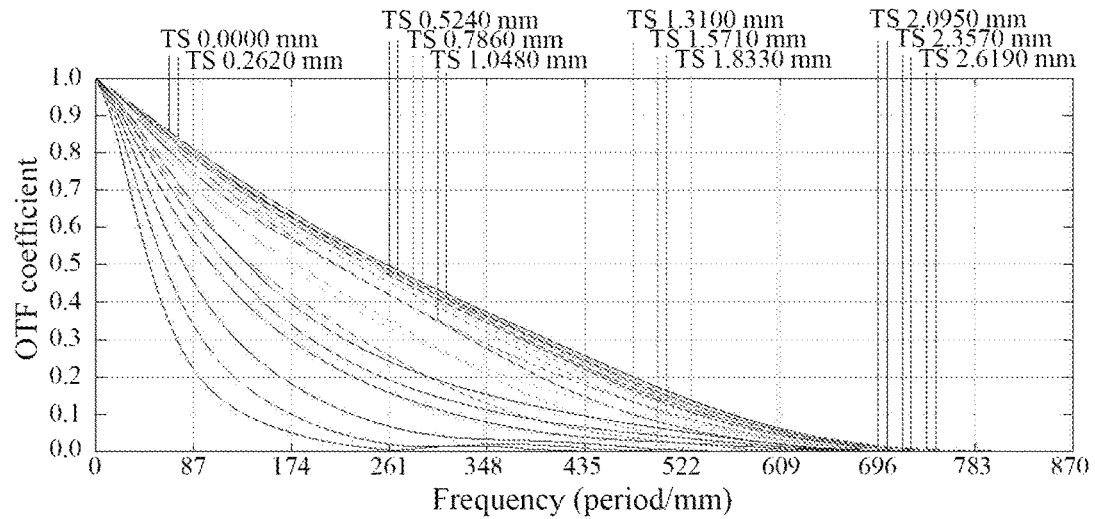
Figure 20A:
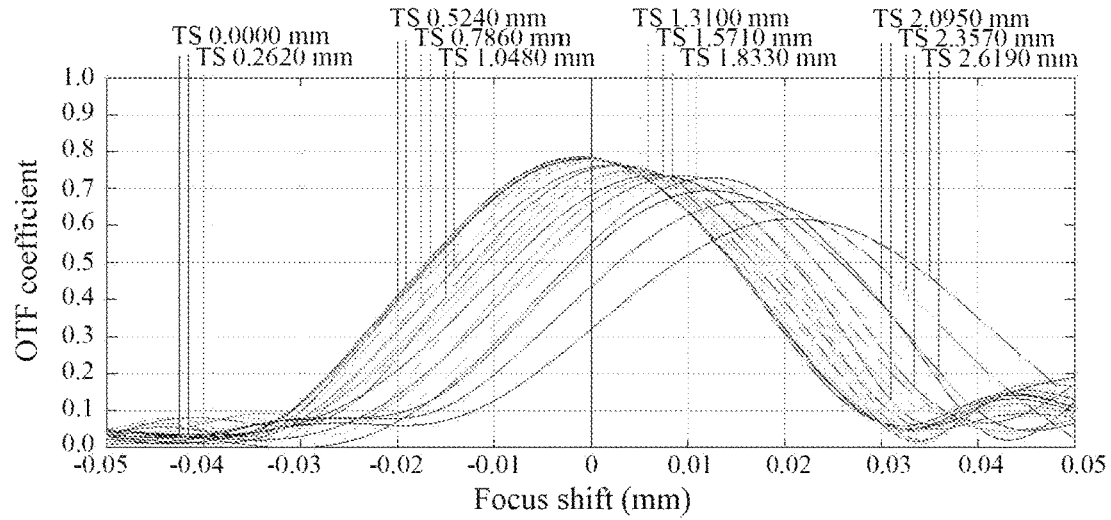
FIG. 20A and FIG. 20B respectively illustrate a focus shift curve diagram and an MTF curve diagram of the optical imaging lens assembly in Example 4 when a distance from the object is infinite, within a waveband range of 470 nm to 650 nm.
Figure 20B:
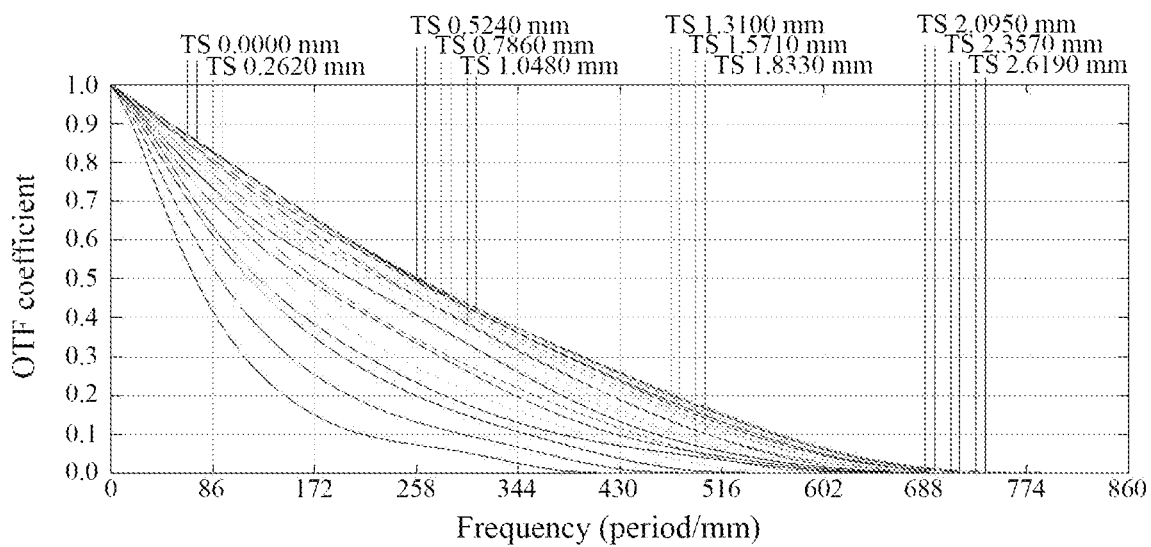

FIG. 17A illustrates the longitudinal aberration curve of the optical imaging lens assembly according to Example 4, representing deviations of focal points converged by light of different wavelengths after passing through the lens assembly. FIG. 17B illustrates the astigmatic curve of the optical imaging lens assembly according to Example 4, representing a curvature of a tangential plane and a curvature of a sagittal plane. FIG. 17C illustrates the distortion curve of the optical imaging lens assembly according to Example 4, representing the amounts of distortion corresponding to different image heights. FIG. 17D illustrates the lateral color curve of the optical imaging lens assembly according to Example 4, representing deviations of different image heights on an imaging plane after light passes through the lens assembly. FIG. 18A, FIG. 19A and FIG. 20A respectively illustrate focus shift curve diagrams of the optical imaging lens assembly in Example 4, when the distance from the object is 350 mm, 150 mm and infinite, within a waveband range of 470 nm to 650 nm of the optical imaging lens assembly, representing the pixel size of a tangential field-of-view and a sagittal field-of-view under different focal shifts. FIG. 18B, FIG. 19B and FIG. 20B respectively illustrate MTF curve diagrams of the optical imaging lens assembly in Example 4, when the distance from the object is 350 mm, 150 mm and infinite, within a waveband range of 470 nm to 650 nm of the optical imaging lens assembly, representing the pixel size of a tangential field-of-view and a sagittal field-of-view at different frequencies. It can be seen from FIG. 17A to FIG. 20B that the optical imaging lens assembly provided in Example 4 can achieve good imaging quality.

Example 5

Figure 21:
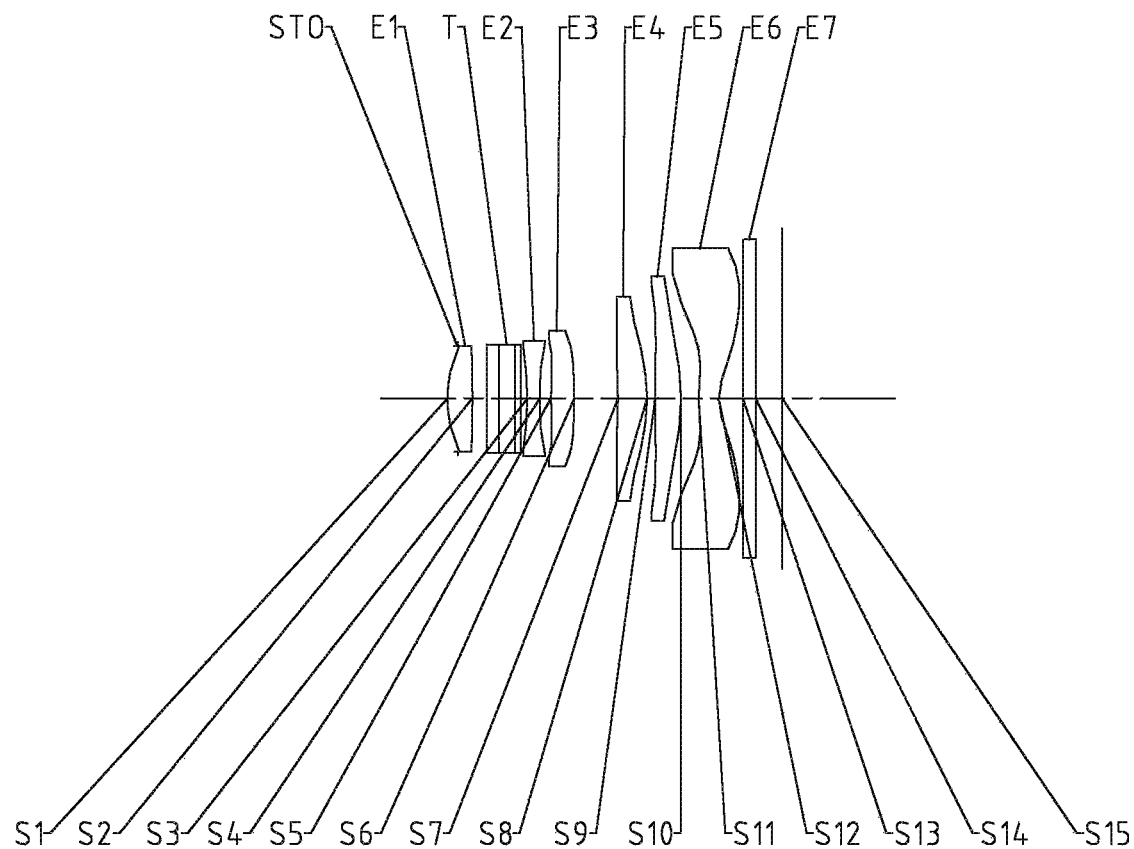
FIG. 21 is a schematic structural diagram illustrating an optical imaging lens assembly according to Example 5 of the present disclosure.

An optical imaging lens assembly according to Example 5 of the present disclosure is described below with reference to FIG. 21 to FIG. 25B. FIG. 21 illustrates a schematic structural diagram of the optical imaging lens assembly according to Example 5 of the present disclosure.

As shown in FIG. 21, the optical imaging lens assembly from an object side to an image side sequentially includes: a diaphragm STO, a first lens E1, an autofocus assembly T (including a flexible film, a liquid material, and a light-transmitting module), a second lens E2, a third lens E3, a fourth lens E4, a fifth lens E5, a sixth lens E6, an optical filter E7 and an imaging plane S15.

The first lens E1 has positive refractive power, an object-side surface S1 of the first lens is a convex surface, and an image-side surface S2 of the first lens is a convex surface. The second lens E2 has negative refractive power, an object-side surface S3 of the second lens is a concave surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has positive refractive power, an object-side surface S7 of the fourth lens is a concave surface, and an image-side surface S8 of the fourth lens is a convex surface. The fifth lens E5 has positive refractive power, an object-side surface S9 of the fifth lens is a convex surface, and an image-side surface S10 of the fifth lens is a convex surface. The sixth lens E6 has negative refractive power, an object-side surface S11 of the sixth lens is a convex surface, and an image-side surface S12 of the sixth lens is a concave surface. The optical filter E7 has an object-side surface S13 and an image-side surface S14. Light from an object sequentially passes through the surfaces S1 to S14 and is finally imaged on the imaging plane S15.

In this example, the total effective focal length f of the optical imaging lens assembly is 4.26 mm, the total track length TTL of the optical imaging lens assembly is 5.50 mm, half of a diagonal length ImgH of an effective pixel area on the imaging plane S15 of the optical imaging lens assembly is 2.77 mm, half of a maximum field-of-view Semi-FOV of the optical imaging lens assembly is 32.0°, and an F number Fno of the optical imaging lens assembly is 2.59.

Table 9 is a table illustrating basic parameters of the optical imaging lens assembly of Example 5, where the units for the radius of curvature, the thickness/distance and the focal length are millimeter (mm). Table 10 shows high-order coefficients applicable to each aspheric surface in Example 5, where the surface shape of each aspheric surface may be defined by the formula (1) given in the above Example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| STO | Spherical | infinite | −0.1724 | | | | |
| S1 | Aspheric | 2.0172 | 0.4119 | 1.55 | 56.1 | 3.52 | −0.0817 |
| S2 | Aspheric | −38.3379 | 0.2339 | | | | 89.5586 |
| | Spherical | RT | 0.0200 | 1.53 | 65.4 | | |
| | Spherical | | 0.2650 | 1.55 | 29.9 | | |
| | Spherical | infinite | 0.1000 | 1.52 | 64.2 | | |
| | Spherical | infinite | 0.1037 | | | | |
| S3 | Aspheric | −3.5861 | 0.2000 | 1.67 | 20.4 | −3.94 | 2.8611 |
| S4 | Aspheric | 10.0006 | 0.1890 | | | | −69.5396 |
| S5 | Aspheric | 7.7958 | 0.3792 | 1.64 | 23.5 | 8.62 | 33.7090 |
| S6 | Aspheric | −18.9985 | 0.7179 | | | | 89.9669 |
| S7 | Aspheric | −8.7832 | 0.4790 | 1.55 | 56.1 | 7.74 | −89.9748 |
| S8 | Aspheric | −2.9069 | 0.1334 | | | | −0.4736 |
| S9 | Aspheric | 60.0861 | 0.4255 | 1.55 | 56.1 | 6.00 | −90.0000 |
| S10 | Aspheric | −3.4536 | 0.2885 | | | | −14.0206 |
| S11 | Aspheric | 2.6496 | 0.3310 | 1.54 | 55.8 | −2.77 | 0.1522 |
| S12 | Aspheric | 0.9108 | 0.3968 | | | | −1.0000 |
| S13 | Spherical | infinite | 0.2100 | 1.52 | 64.2 | | |
| S14 | Spherical | infinite | 0.4352 | | | | |
| S15 | Spherical | infinite | | | | | |

In this example, an image-side surface of the liquid material and the light-transmitting module may be glued together. By changing the radius of curvature of a flexible film surface of the autofocus assembly T and the radius of curvature of the image-side surface of the liquid material, the total effective focal length of the optical imaging lens assembly may be changed with the change of a distance from the object, thereby realizing the autofocus function of the optical imaging lens assembly. Specifically, when the distance D1 between the optical imaging lens assembly and the object is 350 mm, the object-side surface of the autofocus assembly T is a plane surface, and the radius of curvature RT is infinite. When the distance D1 between the optical imaging lens assembly and the object is 150 mm, the object-side surface of the autofocus assembly T is a convex surface, and the radius of curvature RT is 116.2000. When the distance D1 between the optical imaging lens assembly and the object is infinite, the object-side surface of the autofocus assembly T is a concave surface, and the radius of curvature RT is −155.0000.

TABLE 10

| Surface number | A4 | A6 | A8 | A10 | A12 | A14 | A16 |
|---|---|---|---|---|---|---|---|
| S1 | −1.4554E−02 | −6.6215E−03 | −1.3238E−03 | 4.5585E−05 | 3.5833E−05 | −3.1565E−06 | 6.5104E−05 |
| S2 | −1.5160E−02 | −5.3883E−03 | 3.8541E−04 | 5.4088E−04 | −2.3291E−05 | −4.1322E−05 | 6.8137E−05 |
| S3 | 5.1595E−02 | −5.6801E−03 | 6.2053E−04 | −1.7117E−04 | 4.8919E−05 | −4.0378E−05 | 1.9792E−06 |
| S4 | 5.7176E−02 | −5.2008E−03 | 1.1800E−03 | −3.0651E−04 | 1.2492E−04 | −7.9249E−05 | 1.7478E−05 |
| S5 | −1.0084E−01 | −2.1073E−03 | 1.1411E−03 | −9.2797E−05 | 1.1868E−04 | −5.2583E−05 | 1.5740E−05 |
| S6 | −9.8588E−02 | −4.2055E−03 | 1.6771E−03 | −1.0602E−04 | 8.7049E−05 | −4.6274E−05 | 7.2113E−06 |
| S7 | 8.3419E−02 | −1.2132E−02 | 4.1429E−03 | −1.6046E−03 | −3.7998E−04 | 5.6246E−05 | 5.2078E−05 |
| S8 | 1.9781E−01 | 1.6282E−03 | 7.3504E−03 | −2.2113E−03 | −1.9537E−03 | 9.9477E−04 | 4.2531E−05 |
| S9 | −7.6792E−02 | −1.3656E−02 | 6.4029E−03 | −1.1694E−03 | −1.3086E−03 | 2.8027E−03 | 5.7961E−04 |
| S10 | 8.6821E−02 | 3.8004E−03 | −9.1758E−03 | −3.6852E−05 | 3.6076E−04 | 6.8603E−04 | 1.0226E−03 |
| S11 | −1.6953E+00 | 4.0585E−01 | −1.1771E−01 | 3.0106E−02 | −7.3438E−03 | 1.0359E−03 | 7.5773E−05 |
| S12 | −3.5895E+00 | 6.9745E−01 | −2.3109E−01 | 8.8269E−02 | −3.2935E−02 | 1.4016E−02 | −6.1316E−03 |

| Surface number | A18 | A20 |
|---|---|---|
| S1 | 7.3253E−05 | −2.0082E−05 |
| S2 | 5.6352E−06 | −1.5478E−04 |
| S3 | −1.6403E−05 | −6.5019E−06 |
| S4 | −2.6888E−05 | −5.3862E−06 |
| S5 | −5.4637E−06 | 2.3721E−06 |
| S6 | −2.9546E−06 | 2.4998E−06 |
| S7 | 5.5209E−05 | 7.2758E−06 |
| S8 | 2.7752E−04 | −3.2518E−05 |
| S9 | −5.3001E−05 | −3.9500E−04 |
| S10 | −1.1173E−03 | 6.3846E−05 |
| S11 | −1.2451E−03 | 8.4611E−04 |
| S12 | 1.7508E−03 | −3.8549E−04 |

Figure 22A:
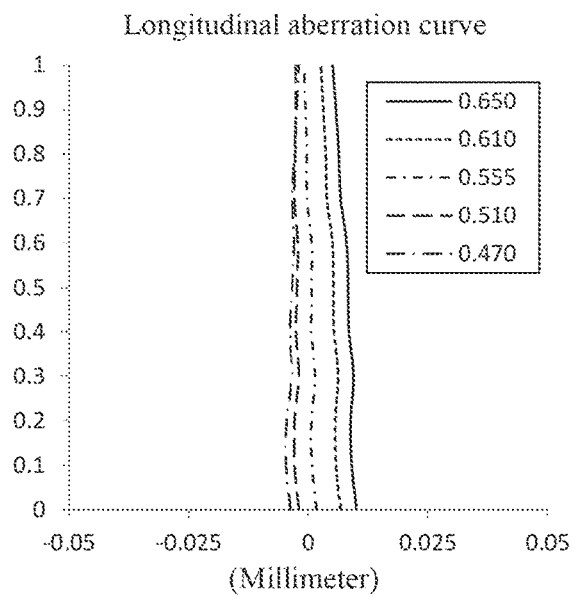
FIGS. 22A-22D respectively illustrate a longitudinal aberration curve, an astigmatic curve, a distortion curve and a lateral color curve of the optical imaging lens assembly according to Example 5.
Figure 22B:
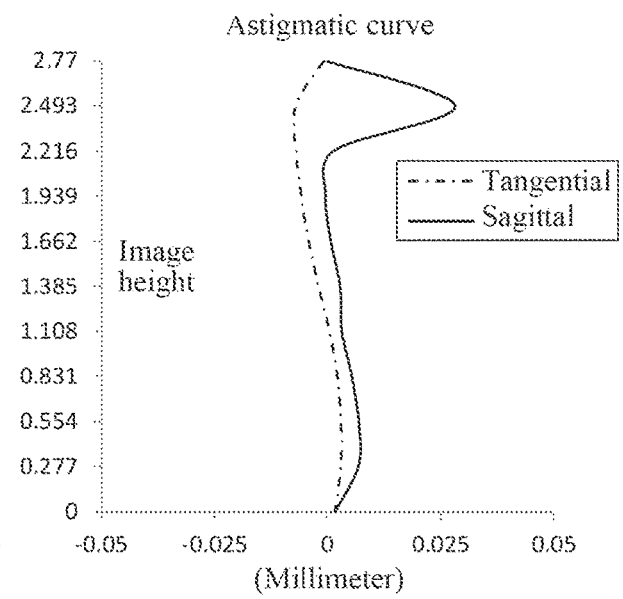
Figure 22C:
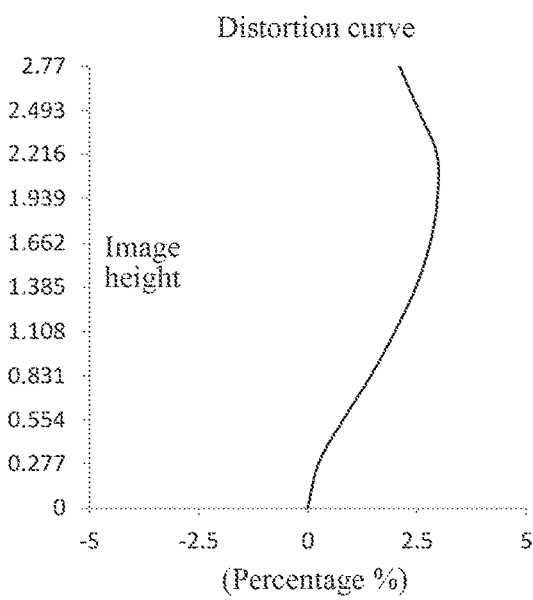
Figure 22D:
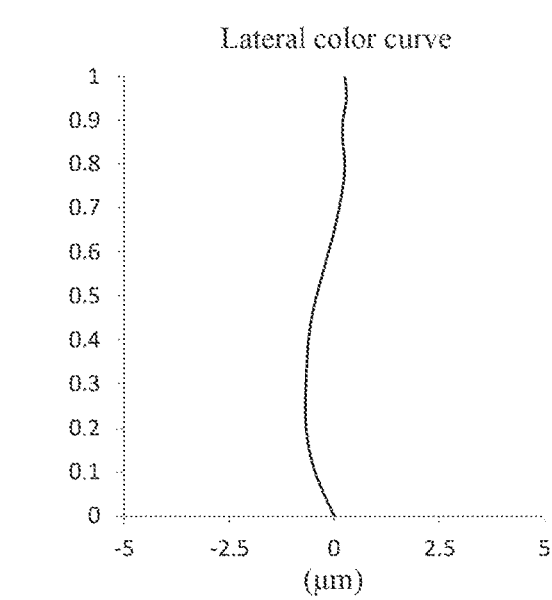
Figure 23A:
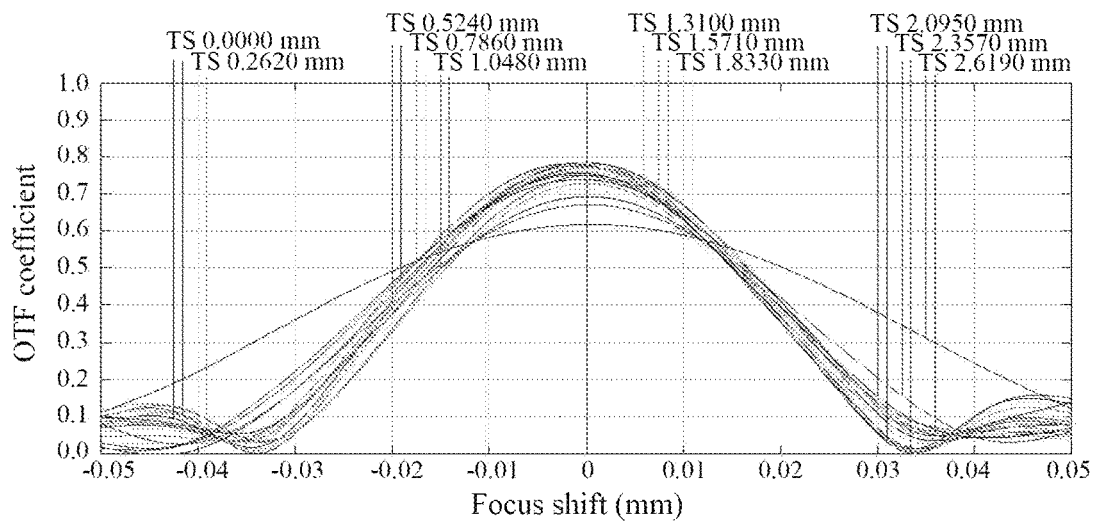
FIG. 23A and FIG. 23B respectively illustrate a focus shift curve diagram and an MTF curve diagram of the optical imaging lens assembly in Example 5 when a distance from the object is 350 mm, within a waveband range of 470 nm to 650 nm.
Figure 23B:
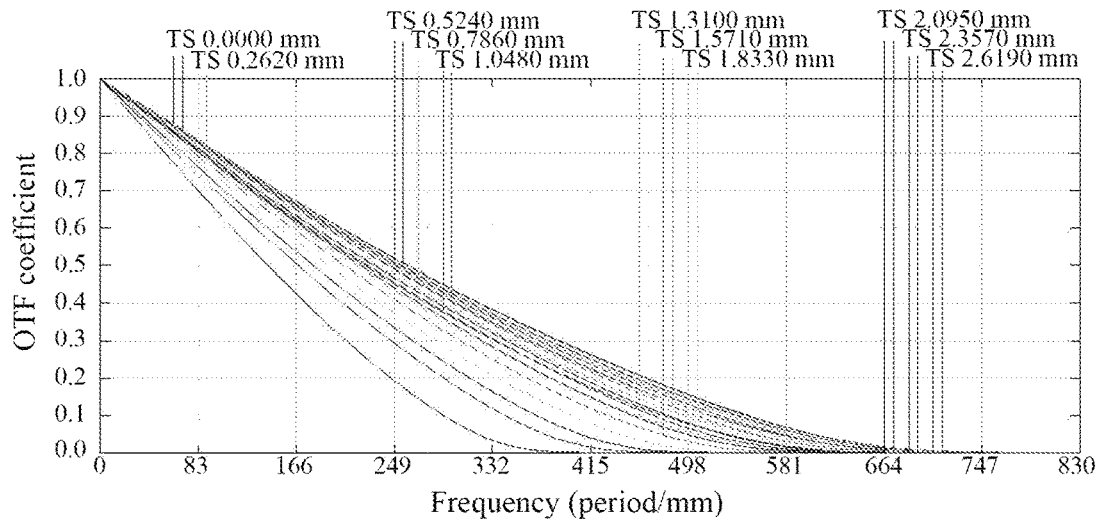
Figure 24A:
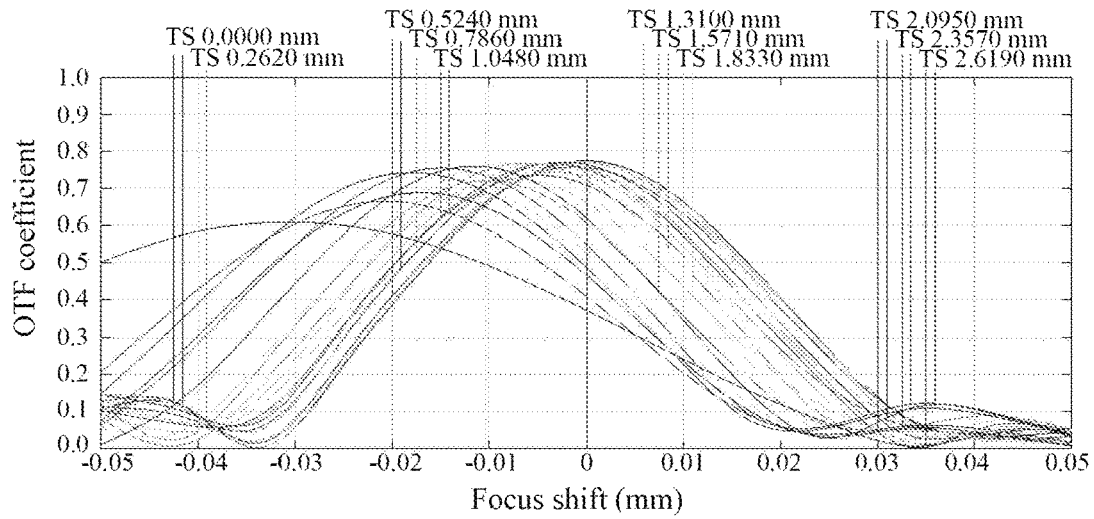
FIG. 24A and FIG. 24B respectively illustrate a focus shift curve diagram and an MTF curve diagram of the optical imaging lens assembly in Example 5 when a distance from the object is 150 mm, within a waveband range of 470 nm to 650 nm.
Figure 24B:
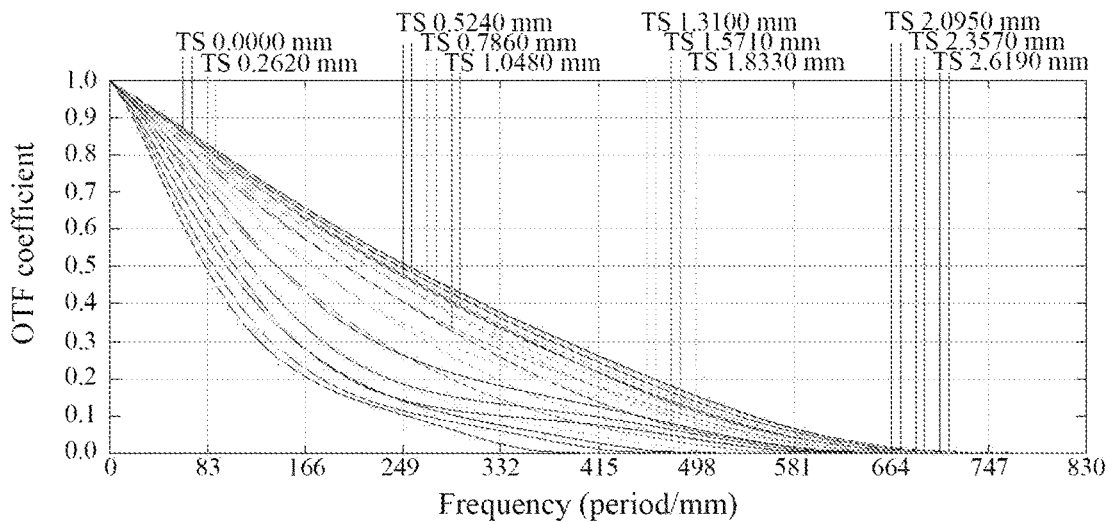
Figure 25A:
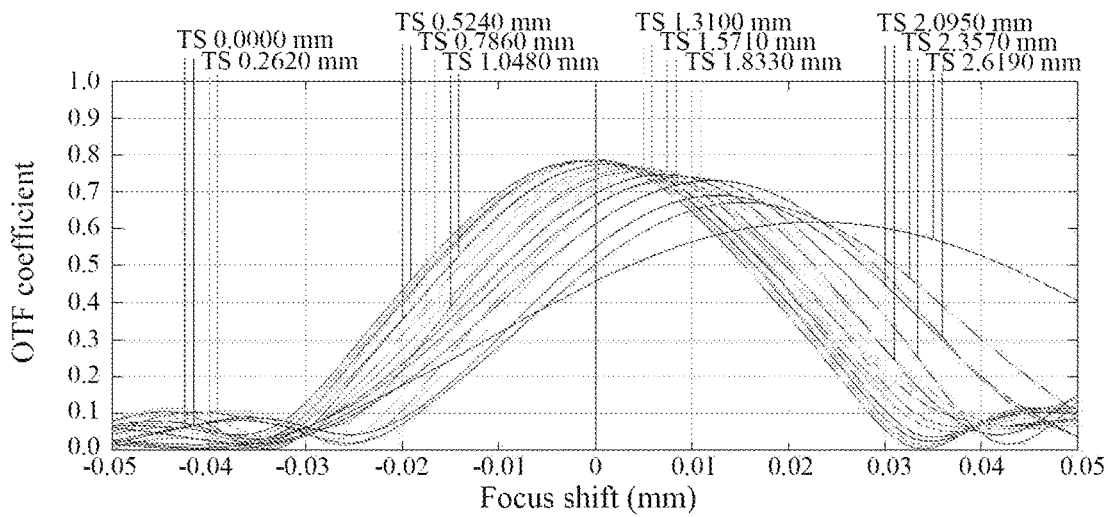
FIG. 25A and FIG. 25B respectively illustrate a focus shift curve diagram and an MTF curve diagram of the optical imaging lens assembly in Example 5 when a distance from the object is infinite, within a waveband range of 470 nm to 650 nm.
Figure 25B:
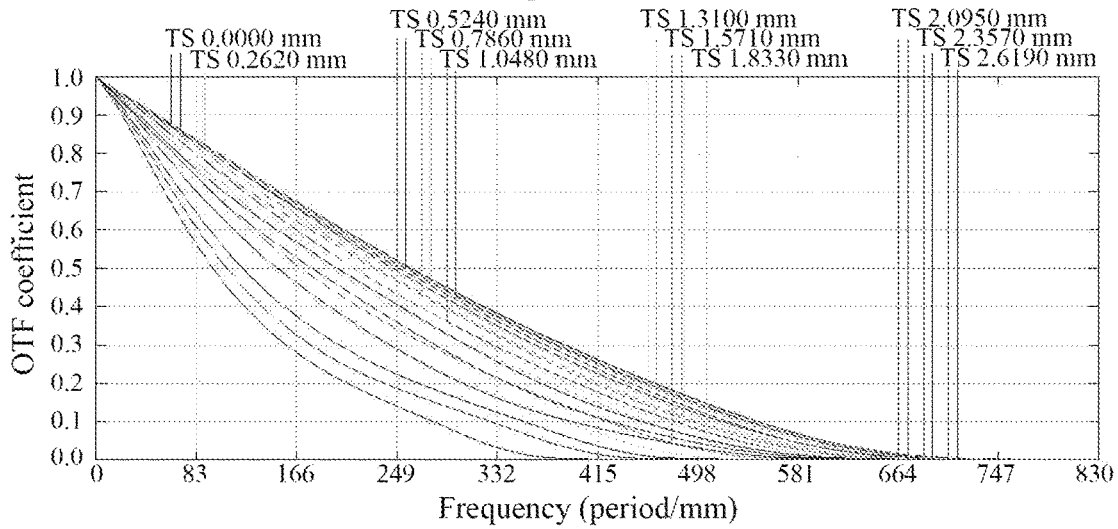

FIG. 22A illustrates the longitudinal aberration curve of the optical imaging lens assembly according to Example 5, representing deviations of focal points converged by light of different wavelengths after passing through the lens assembly. FIG. 22B illustrates the astigmatic curve of the optical imaging lens assembly according to Example 5, representing a curvature of a tangential plane and a curvature of a sagittal plane. FIG. 22C illustrates the distortion curve of the optical imaging lens assembly according to Example 5, representing the amounts of distortion corresponding to different image heights. FIG. 22D illustrates the lateral color curve of the optical imaging lens assembly according to Example 5, representing deviations of different image heights on an imaging plane after light passes through the lens assembly. FIG. 23A, FIG. 24A and FIG. 25A respectively illustrate focus shift curve diagrams of the optical imaging lens assembly in Example 5, when the distance from the object is 350 mm, 150 mm and infinite, within a waveband range of 470 nm to 650 nm of the optical imaging lens assembly, representing the pixel size of a tangential field-of-view and a sagittal field-of-view under different focal shifts. FIG. 23B, FIG. 24B and FIG. 25B respectively illustrate MTF curve diagrams of the optical imaging lens assembly in Example 5, when the distance from the object is 350 mm, 150 mm and infinite, within a waveband range of 470 nm to 650 nm of the optical imaging lens assembly, representing the pixel size of a tangential field-of-view and a sagittal field-of-view at different frequencies. It can be seen from FIG. 22A to FIG. 25B that the optical imaging lens assembly provided in Example 5 can achieve good imaging quality.

Example 6

An optical imaging lens assembly according to Example 6 of the present disclosure is described below with reference to FIG. 26 to FIG. 30B. FIG. 26 illustrates a schematic structural diagram of the optical imaging lens assembly according to Example 6 of the present disclosure.

As shown in FIG. 26, the optical imaging lens assembly from an object side to an image side sequentially includes: a diaphragm STO, a first lens E1, an autofocus assembly T (including a flexible film, a liquid material, and a light-transmitting module), a second lens E2, a third lens E3, a fourth lens E4, a fifth lens E5, a sixth lens E6, an optical filter E7 and an imaging plane S15.

The first lens E1 has positive refractive power, an object-side surface S1 of the first lens is a convex surface, and an image-side surface S2 of the first lens is a convex surface. The second lens E2 has negative refractive power, an object-side surface S3 of the second lens is a concave surface, and an image-side surface S4 of the second lens is a concave surface. The third lens E3 has positive refractive power, an object-side surface S5 of the third lens is a concave surface, and an image-side surface S6 of the third lens is a convex surface. The fourth lens E4 has positive refractive power, an object-side surface S7 of the fourth lens is a concave surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has negative refractive power, an object-side surface S11 of the sixth lens is a convex surface, and an image-side surface S12 of the sixth lens is a concave surface. The optical filter E7 has an object-side surface S13 and an image-side surface S14. Light from an object sequentially passes through the surfaces S1 to S14 and is finally imaged on the imaging plane S15.

In this example, the total effective focal length f of the optical imaging lens assembly is 4.11 mm, the total track length TTL of the optical imaging lens assembly is 5.21 mm, half of a diagonal length ImgH of an effective pixel area on the imaging plane S15 of the optical imaging lens assembly is 2.77 mm, half of a maximum field-of-view Semi-FOV of the optical imaging lens assembly is 32.8°, and an F number Fno of the optical imaging lens assembly is 2.58.

Table 11 is a table illustrating basic parameters of the optical imaging lens assembly of Example 6, where the units for the radius of curvature, the thickness/distance and the focal length are millimeter (mm). Table 12 shows high-order coefficients applicable to each aspheric surface in Example 6, where the surface shape of each aspheric surface may be defined by the formula (1) given in the above Example 1.

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | infinite | D1 | | | | |
| STO | Spherical | infinite | −0.1696 | | | | |
| S1 | Aspheric | 1.7597 | 0.4748 | 1.55 | 56.1 | 3.04 | −0.1313 |
| S2 | Aspheric | −25.8751 | 0.2040 | | | | −90.0000 |
| | Spherical | RT | 0.0200 | 1.53 | 65.4 | | |
| | Spherical | | 0.2650 | 1.55 | 29.9 | | |
| | Spherical | infinite | 0.1000 | 1.52 | 64.2 | | |
| | Spherical | infinite | 0.1033 | | | | |
| S3 | Aspheric | −2.9478 | 0.2000 | 1.67 | 20.4 | −3.80 | 3.1751 |
| S4 | Aspheric | 18.4582 | 0.2261 | | | | 58.6667 |
| S5 | Aspheric | −69.7482 | 0.4192 | 1.64 | 23.5 | 19.06 | 90.0000 |
| S6 | Aspheric | −10.4715 | 0.4500 | | | | 54.3067 |
| S7 | Aspheric | −10.0000 | 0.6076 | 1.55 | 56.1 | 3.38 | −56.2554 |
| S8 | Aspheric | −1.5908 | 0.1979 | | | | −0.9510 |
| S9 | Aspheric | −3.1460 | 0.2786 | 1.55 | 56.1 | −29.09 | 0.0049 |
| S10 | Aspheric | −4.0458 | 0.3644 | | | | −0.1430 |
| S11 | Aspheric | 1.8436 | 0.3138 | 1.54 | 55.8 | −3.34 | −0.9894 |
| S12 | Aspheric | 0.8550 | 0.3505 | | | | −0.9996 |
| S13 | Spherical | infinite | 0.2100 | 1.52 | 64.2 | | |
| S14 | Spherical | infinite | 0.4282 | | | | |
| S15 | Spherical | infinite | | | | | |

In this example, an image-side surface of the liquid material and the light-transmitting module may be glued together. By changing the radius of curvature of a flexible film surface of the autofocus assembly T and the radius of curvature of the image-side surface of the liquid material, the total effective focal length of the optical imaging lens assembly may be changed with the change of a distance from the object, thereby realizing the autofocus function of the optical imaging lens assembly. Specifically, when the distance D1 between the optical imaging lens assembly and the object is 350 mm, the object-side surface of the autofocus assembly T is a plane surface, and the radius of curvature RT is infinite. When the distance D1 between the optical imaging lens assembly and the object is 150 mm, the object-side surface of the autofocus assembly T is a convex surface, and the radius of curvature RT is 110.8000. When the distance D1 between the optical imaging lens assembly and the object is infinite, the object-side surface of the autofocus assembly T is a concave surface, and the radius of curvature RT is −150.8000.

Figures 27C, 27D:
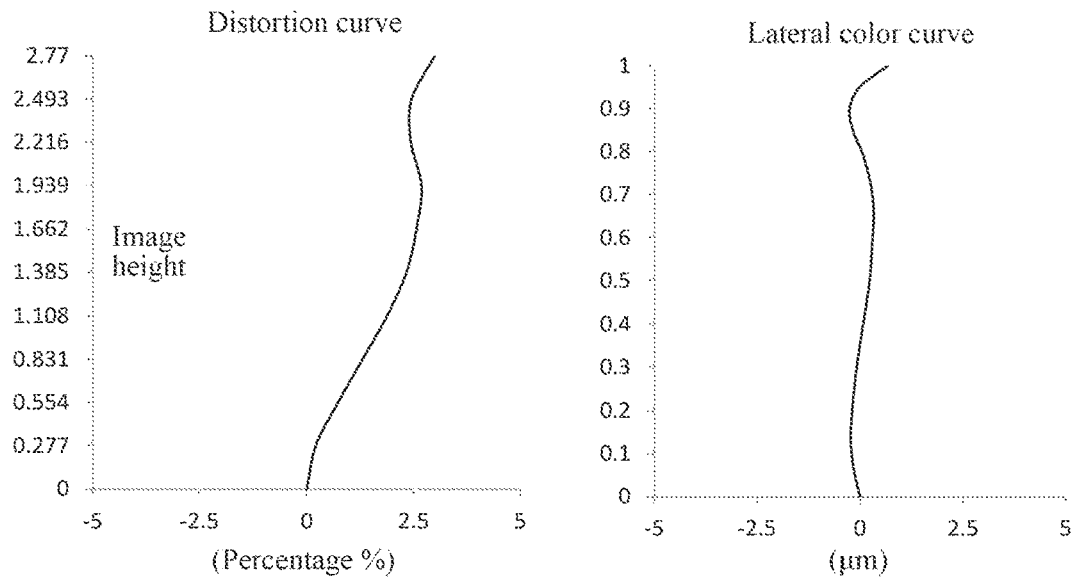
Figure 28A:
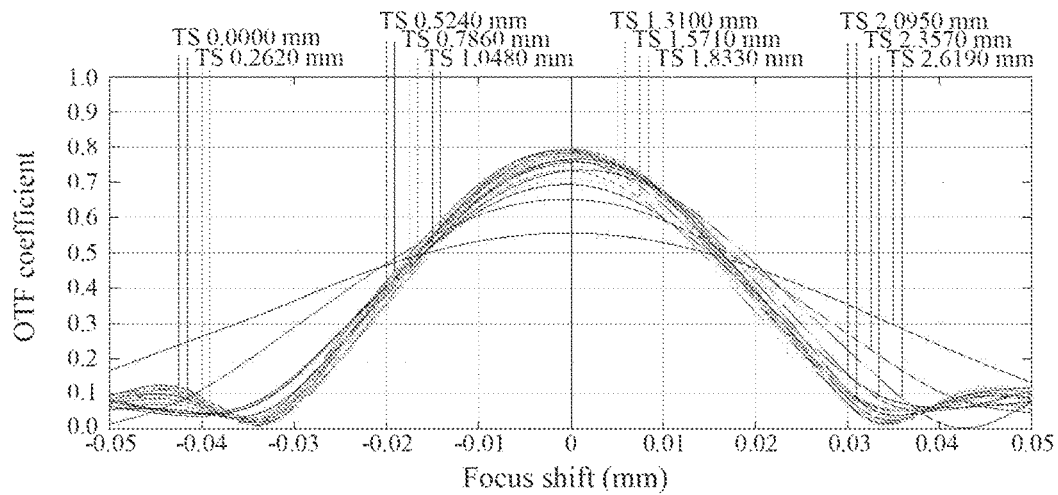
FIG. 28A and FIG. 28B respectively illustrate a focus shift curve diagram and an MTF curve diagram of the optical imaging lens assembly in Example 6 when a distance from the object is 350 mm, within a waveband range of 470 nm to 650 nm.
Figure 28B:
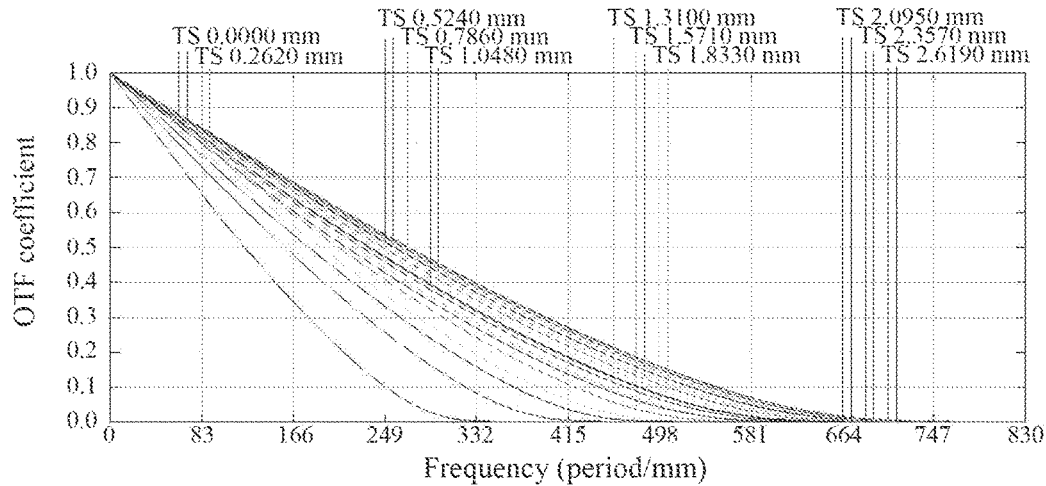
Figure 29A:
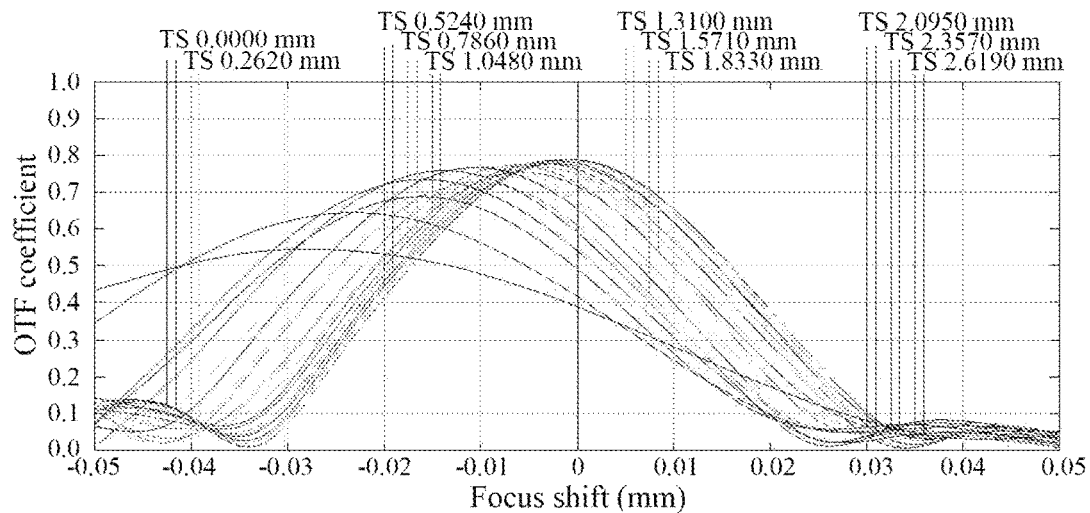
FIG. 29A and FIG. 29B respectively illustrate a focus shift curve diagram and an MTF curve diagram of the optical imaging lens assembly in Example 6 when a distance from the object is 150 mm, within a waveband range of 470 nm to 650 nm.
Figure 29B:
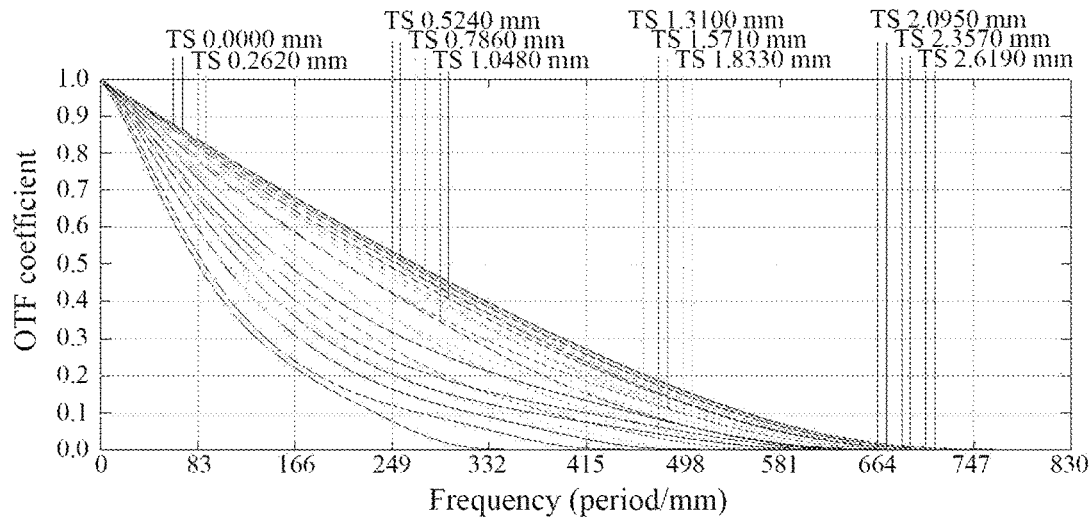
Figure 30A:
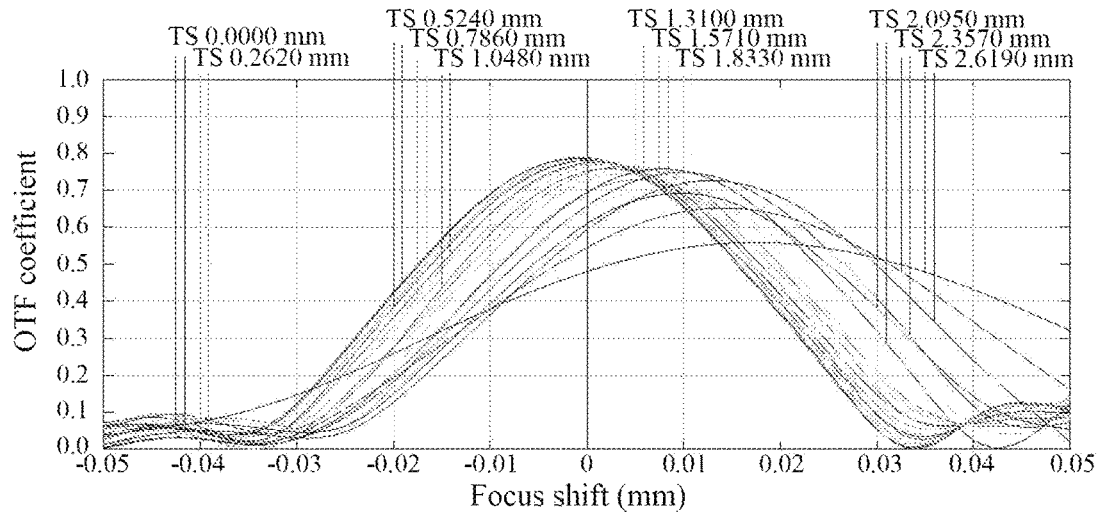
FIG. 30A and FIG. 30B respectively illustrate a focus shift curve diagram and an MTF curve diagram of the optical imaging lens assembly in Example 6 when a distance from the object is infinite, within a waveband range of 470 nm to 650 nm.
Figure 30B:
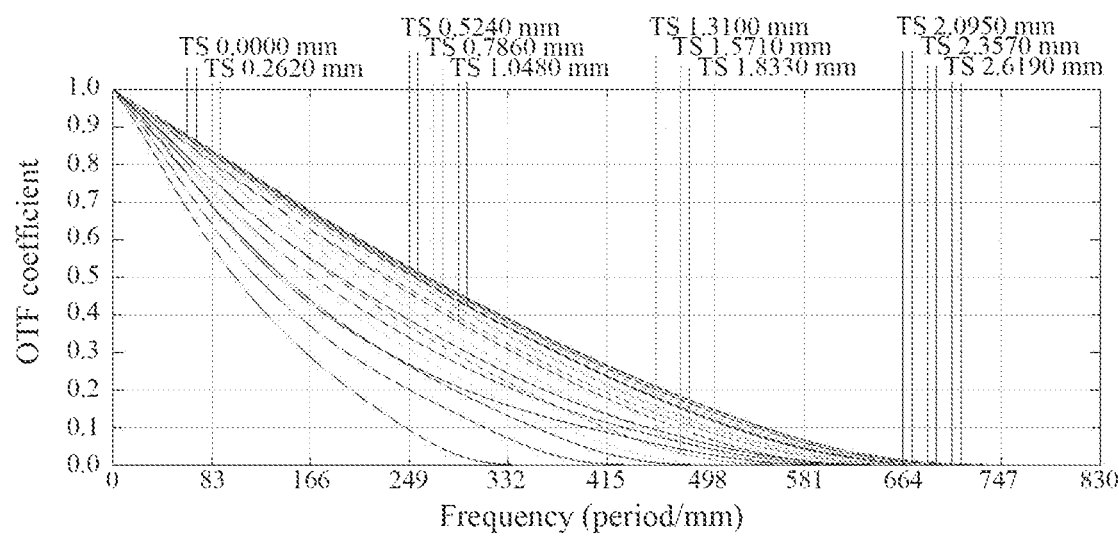

FIG. 27A illustrates the longitudinal aberration curve of the optical imaging lens assembly according to Example 6, representing deviations of focal points converged by light of different wavelengths after passing through the lens assembly. FIG. 27B illustrates the astigmatic curve of the optical imaging lens assembly according to Example 6, representing a curvature of a tangential plane and a curvature of a sagittal plane. FIG. 27C illustrates the distortion curve of the optical imaging lens assembly according to Example 6, representing the amounts of distortion corresponding to different image heights. FIG. 27D illustrates the lateral color curve of the optical imaging lens assembly according to Example 6, representing deviations of different image heights on an imaging plane after light passes through the lens assembly. FIG. 28A, FIG. 29A and FIG. 30A respectively illustrate focus shift curve diagrams of the optical imaging lens assembly in Example 6, when the distance from the object is 350 mm, 150 mm and infinite, within a waveband range of 470 nm to 650 nm of the optical imaging lens assembly, representing the pixel size of a tangential field-of-view and a sagittal field-of-view under different focal shifts. FIG. 28B, FIG. 29B and FIG. 30B respectively illustrate MTF curve diagrams of the optical imaging lens assembly in Example 6, when the distance from the object is 350 mm, 150 mm and infinite, within a waveband range of 470 nm to 650 nm of the optical imaging lens assembly, representing the pixel size of a tangential field-of-view and a sagittal field-of-view at different frequencies. It can be seen from FIG. 27A to FIG. 30B that the optical imaging lens assembly provided in Example 6 can achieve good imaging quality.

In view of the above, examples 1 to 6 respectively satisfy the relationship shown in Table 13.

TABLE 12

| Surface number | A4 | A6 | A8 | A10 | A12 | A14 | A16 |
|---|---|---|---|---|---|---|---|
| S1 | −1.3516E−02 | −6.3348E−03 | −1.4553E−03 | 7.6720E−05 | 2.9164E−04 | 1.6296E−04 | 4.1714E−06 |
| S2 | −1.7281E−02 | −5.0943E−03 | −3.6664E−04 | 4.3543E−04 | 4.0486E−04 | 2.3734E−04 | 7.7952E−05 |
| S3 | 4.9564E−02 | −6.3146E−03 | 5.7081E−04 | −7.7683E−05 | 1.3691E−05 | −3.4489E−06 | −1.4005E−06 |
| S4 | 5.8383E−02 | −5.7093E−03 | 1.1540E−03 | 1.3352E−03 | 1.2931E−04 | 4.5704E−05 | 1.9610E−05 |
| S5 | −1.0411E−01 | −1.9585E−03 | 3.8953E−04 | 5.7415E−04 | 3.9108E−04 | 1.8617E−04 | 9.9629E−05 |
| S6 | −1.4936E−01 | −3.3147E−04 | 5.8158E−04 | 5.4547E−04 | 3.8196E−04 | 1.0523E−04 | 5.6521E−05 |
| S7 | 1.3019E−01 | 8.3925E−03 | −5.4742E−03 | −1.6421E−03 | 1.1219E−03 | −2.4457E−04 | 1.6094E−04 |
| S8 | 5.3867E−01 | −1.1833E−02 | 4.7796E−03 | −9.1537E−03 | 3.3775E−03 | −2.7705E−04 | 6.6501E−05 |
| S9 | 4.4703E−01 | −9.3786E−02 | 2.7681E−02 | −5.5577E−03 | 3.7003E−03 | −1.4916E−03 | −5.4183E−04 |
| S10 | 3.1221E−01 | 1.7103E−02 | −1.4704E−02 | 5.8742E−03 | −3.1442E−03 | 2.4763E−03 | −1.2957E−03 |
| S11 | −2.0568E+00 | 6.5321E−01 | −1.9921E−01 | 5.8830E−02 | −2.4318E−02 | 1.3255E−02 | −4.1583E−03 |
| S12 | −3.9342E+00 | 8.0914E−01 | −2.6193E−01 | 1.1030E−01 | −4.7576E−02 | 2.1627E−02 | −9.1443E−03 |

| Surface number | A18 | A20 |
|---|---|---|
| S1 | −8.2283E−05 | −1.0235E−04 |
| S2 | −2.0740E−05 | −6.4155E−05 |
| S3 | −3.1757E−06 | −2.4276E−06 |
| S4 | 3.3954E−06 | −1.4510E−06 |
| S5 | 4.1525E−05 | 1.5864E−05 |
| S6 | 1.7268E−05 | 5.8420E−06 |
| S7 | 1.3339E−04 | −1.1125E−05 |
| S8 | 4.2260E−04 | 1.9602E−04 |
| S9 | 1.2900E−03 | 3.7372E−04 |
| S10 | 1.3464E−03 | −9.7791E−04 |
| S11 | 7.2482E−04 | −2.1417E−03 |
| S12 | 6.3434E−03 | −3.2186E−03 |

TABLE 13

| Conditional/Example | 1 | 2 | 3 | 4 | 5 | 6 |
|---|---|---|---|---|---|---|
| |f/R10| | 4.93 | 5.42 | 4.41 | 2.35 | 1.23 | 1.01 |
| f1/R1 | 1.79 | 1.89 | 2.31 | 1.80 | 1.75 | 1.73 |
| |R6/f3| | 1.87 | 1.36 | 1.71 | 1.92 | 2.20 | 0.55 |
| f4/R8 | −2.15 | −2.34 | −2.05 | −2.23 | −2.66 | −2.12 |
| TTL/ImgH | 1.88 | 2.03 | 1.81 | 1.95 | 1.99 | 1.88 |
| CT1/D | 1.61 | 1.50 | 1.18 | 1.42 | 1.07 | 1.23 |
| D/T1−T | 2.57 | 3.94 | 5.78 | 3.90 | 1.65 | 1.89 |
| T34/CT5 | 2.30 | 3.38 | 1.40 | 3.26 | 1.69 | 1.62 |
| CT4/CT2 | 2.76 | 3.21 | 4.99 | 2.39 | 2.40 | 3.04 |

The present disclosure further provides an imaging apparatus, having an electronic photosensitive element, which may be a photosensitive Charge-Coupled Device (CCD) or a Complementary Metal-Oxide Semiconductor (CMOS).

The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, along an optical axis from an object side to an image side, sequentially comprising:
   a first lens having refractive power;
   an autofocus assembly, and a radius of curvature of an object-side surface of the autofocus assembly being variable;
   a second lens having refractive power, and an image-side surface of the second lens being a concave surface;
   a third lens having refractive power, and an image-side surface of the third lens being a convex surface;
   a fourth lens having refractive power, an object-side surface of the fourth lens being a concave surface, and an image-side surface of the fourth lens being a convex surface; and
   at least one subsequent lens having refractive power;
   wherein a radius of curvature R6 of the image-side surface of the third lens and an effective focal length f3 of the third lens satisfy: $0.5<|R6/f3|<2.5$.

2. The optical imaging lens assembly according to claim 1, wherein the at least one subsequent lens comprises a fifth lens, and wherein a total effective focal length f of the optical imaging lens assembly and a radius of curvature R10 of an image-side surface of the fifth lens satisfy: $1.0<|f/R10|<5.5$.

3. The optical imaging lens assembly according to claim 1, wherein an effective focal length f1 of the first lens and a radius of curvature R1 of an object-side surface of the first lens satisfy: $1.5<f1/R1<2.5$.

4. The optical imaging lens assembly according to claim 1, wherein an effective focal length f4 of the fourth lens and a radius of curvature R8 of the image-side surface of the fourth lens satisfy: $-3.0<f4/R8<-2.0$.

5. The optical imaging lens assembly according to claim 1, wherein a center thickness CT1 of the first lens on the optical axis and a center thickness D of the autofocus assembly on the optical axis satisfy: $1.0<CT1/D<2.0$.

6. The optical imaging lens assembly according to claim 1, wherein a center thickness CT4 of the fourth lens on the optical axis and a center thickness CT2 of the second lens on the optical axis satisfy: $2.0<CT4/CT2<5.0$.

7. The optical imaging lens assembly according to claim 1, wherein half of a maximum field-of-view Semi-FOV of the optical imaging lens assembly satisfies: Semi-FOV>25°.

8. The optical imaging lens assembly according to claim 1, wherein a distance TTL from the object-side surface of the first lens to an imaging plane of the optical imaging lens assembly on the optical axis and half of a diagonal length ImgH of an effective pixel area on the imaging plane of the optical imaging lens assembly satisfy: $1.5<TTL/ImgH<2.1$.

9. The optical imaging lens assembly according to claim 1, wherein the autofocus assembly along the optical axis from the first lens to the second lens sequentially comprises: a flexible film, a liquid material, and a light-transmitting module, wherein,
   the flexible film is arranged on an object-side surface of the liquid material; and
   an image-side surface of the liquid material is glued to the light-transmitting module.

10. An optical imaging lens assembly, along an optical axis from an object side to an image side, sequentially comprising:
    a first lens having refractive power;
    an autofocus assembly, and a radius of curvature of an object-side surface of the autofocus assembly being variable;
    a second lens having refractive power, and an image-side surface of the second lens being a concave surface;
    a third lens having refractive power, and an image-side surface of the third lens being a convex surface;
    a fourth lens having refractive power, an object-side surface of the fourth lens being a concave surface, and an image-side surface of the fourth lens being a convex surface; and
    at least one subsequent lens having refractive power;
    wherein a center thickness D of the autofocus assembly on the optical axis and a spaced interval $T_{1-T}$ between the first lens and the autofocus assembly on the optical axis satisfy: $1.5<D/T_{1-T}<6.0$.

11. An optical imaging lens assembly, along an optical axis from an object side to an image side, sequentially comprising:
    a first lens having refractive power;
    an autofocus assembly, and a radius of curvature of an object-side surface of the autofocus assembly being variable;
    a second lens having refractive power, and an image-side surface of the second lens being a concave surface;
    a third lens having refractive power, and an image-side surface of the third lens being a convex surface;
    a fourth lens having refractive power, an object-side surface of the fourth lens being a concave surface, and an image-side surface of the fourth lens being a convex surface; and
    at least one subsequent lens having refractive power;
    wherein the at least one subsequent lens comprises a fifth lens, and wherein a center thickness CT5 of the fifth lens on the optical axis and a spaced interval T34 between the third lens and the fourth lens on the optical axis satisfy: $1.0<T34/CT5<3.5$.

* * * * *